United States Patent
Cams et al.

(10) Patent No.: US 10,935,748 B2
(45) Date of Patent: Mar. 2, 2021

(54) MODULARIZED CABLE TERMINATION UNIT

(71) Applicant: COMMSCOPE CONNECTIVITY BELGIUM BVBA, Kessel-Lo (BE)

(72) Inventors: Eddy Luc Cams, Bilzen (BE); Pieter Doultremont, Kermt-Hasselt (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 16/605,455

(22) PCT Filed: Apr. 17, 2018

(86) PCT No.: PCT/EP2018/059760
§ 371 (c)(1),
(2) Date: Oct. 15, 2019

(87) PCT Pub. No.: WO2018/192917
PCT Pub. Date: Oct. 25, 2018

(65) Prior Publication Data
US 2020/0049919 A1    Feb. 13, 2020

Related U.S. Application Data

(60) Provisional application No. 62/486,199, filed on Apr. 17, 2017.

(51) Int. Cl.
*G02B 6/44* (2006.01)
(52) U.S. Cl.
CPC .................. *G02B 6/4471* (2013.01)

(58) Field of Classification Search
CPC ............................ G02B 6/4471; G02B 6/4444
See application file for complete search history.

(56) References Cited

U.S. PATENT DOCUMENTS

| | | |
|---|---|---|
| 4,552,998 A | 11/1985 | Ziegler |
| 4,986,761 A | 1/1991 | Gladden, Jr. et al. |
| 5,121,458 A | 6/1992 | Nilsson et al. |
| 5,440,666 A | 8/1995 | Burek et al. |
| 5,455,391 A | 10/1995 | Demesmaeker et al. |
| 5,491,766 A | 2/1996 | Huynh |
| 5,502,282 A | 3/1996 | Kunze |

(Continued)

FOREIGN PATENT DOCUMENTS

| | | |
|---|---|---|
| DE | 37 26 718 A1 | 2/1989 |
| EP | 0 646 294 B1 | 11/1996 |

(Continued)

OTHER PUBLICATIONS

International Search Report and Written Opinion of the International Searching Authority for International Patent Application No. PCT/EP2018/059760 dated Jul. 19, 2018, 17 pages.

*Primary Examiner* — Ryan A Lepisto
(74) *Attorney, Agent, or Firm* — Merchant & Gould P.C.

(57) ABSTRACT

A cable termination unit is provided to clamp a cable separately from a telecommunications closure and then mounted to a telecommunications closure. The cable termination unit includes a body which has a strength member clamp portion for mounting a strength member of a cable and a jacket clamp portion for mounting a cable jacket. The jacket clamp portion is configured to selectively engage different jacket mount devices.

20 Claims, 28 Drawing Sheets

(56) References Cited

U.S. PATENT DOCUMENTS

| | | |
|---|---|---|
| 5,696,351 A | 12/1997 | Benn et al. |
| 5,775,702 A | 7/1998 | Laeremans et al. |
| 5,814,770 A | 9/1998 | Pieck et al. |
| 5,824,961 A | 10/1998 | Burek et al. |
| 5,883,333 A | 3/1999 | Wambeke et al. |
| 6,051,792 A | 4/2000 | Damm et al. |
| 6,150,608 A | 11/2000 | Wambeke et al. |
| 6,322,378 B1 | 11/2001 | Auclair |
| 6,933,442 B2 | 8/2005 | Franks, Jr. |
| 7,254,307 B2 | 8/2007 | Xin |
| 8,903,216 B2 * | 12/2014 | Thompson ............ G02B 6/4477 |
| | | 385/136 |
| 9,753,239 B2 * | 9/2017 | Allen .................... G02B 6/4471 |
| 10,209,473 B2 * | 2/2019 | Bishop ................. H02G 15/115 |
| 10,495,838 B2 * | 12/2019 | Coenegracht ........ G02B 6/3825 |
| 2006/0150483 A1 | 7/2006 | Zayer |
| 2006/0275006 A1 | 12/2006 | Xin |
| 2006/0283619 A1 | 12/2006 | Kowalczyk et al. |
| 2007/0235422 A1 | 10/2007 | Bornemann |
| 2010/0054688 A1 | 3/2010 | Mullaney et al. |
| 2010/0061692 A1 | 3/2010 | Hetzer et al. |
| 2010/0092147 A1 | 4/2010 | Desard et al. |
| 2012/0230646 A1 | 9/2012 | Thompson et al. |
| 2013/0058616 A1 | 3/2013 | Cote et al. |
| 2014/0314388 A1 | 10/2014 | Alaerts et al. |
| 2015/0093090 A1 * | 4/2015 | Aznag .................. G02B 6/4471 |
| | | 385/135 |
| 2015/0168663 A1 * | 6/2015 | Aznag .................. G02B 6/4444 |
| | | 385/135 |
| 2016/0077300 A1 * | 3/2016 | Geens .................. G02B 6/3887 |
| | | 385/136 |
| 2018/0261986 A1 * | 9/2018 | Kempeneers ........ G02B 6/4442 |

FOREIGN PATENT DOCUMENTS

| | | |
|---|---|---|
| EP | 0 646 295 B1 | 12/1996 |
| GB | 2 298 053 A | 8/1996 |
| JP | 2012-154419 A | 8/2012 |
| KR | 10-1606203 B1 | 3/2016 |
| WO | 96/09671 A1 | 3/1996 |
| WO | 96/24185 A1 | 8/1996 |
| WO | 97/12268 A1 | 4/1997 |
| WO | 2005/020400 A1 | 3/2005 |
| WO | 2013/092220 A2 | 6/2013 |
| WO | 2013/149846 A1 | 10/2013 |
| WO | 2013/149857 A1 | 10/2013 |

* cited by examiner

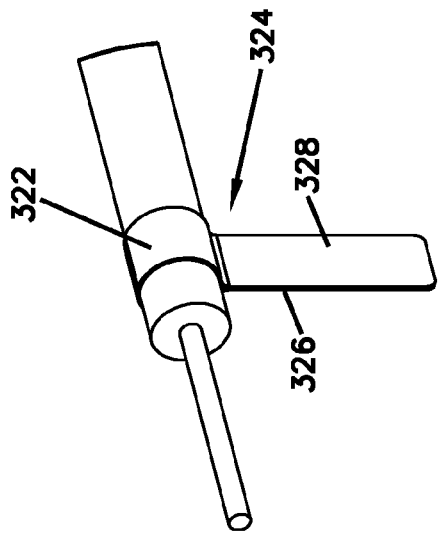
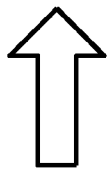
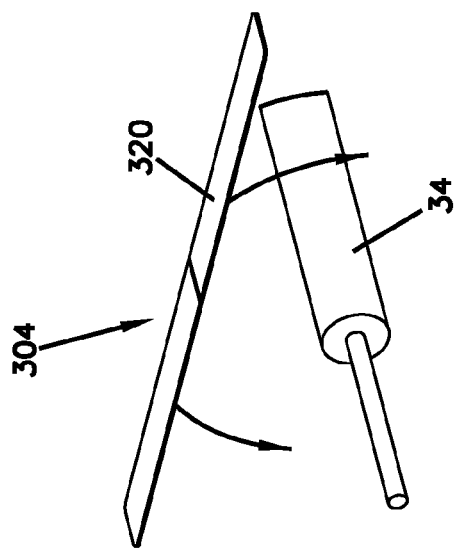
FIG. 24

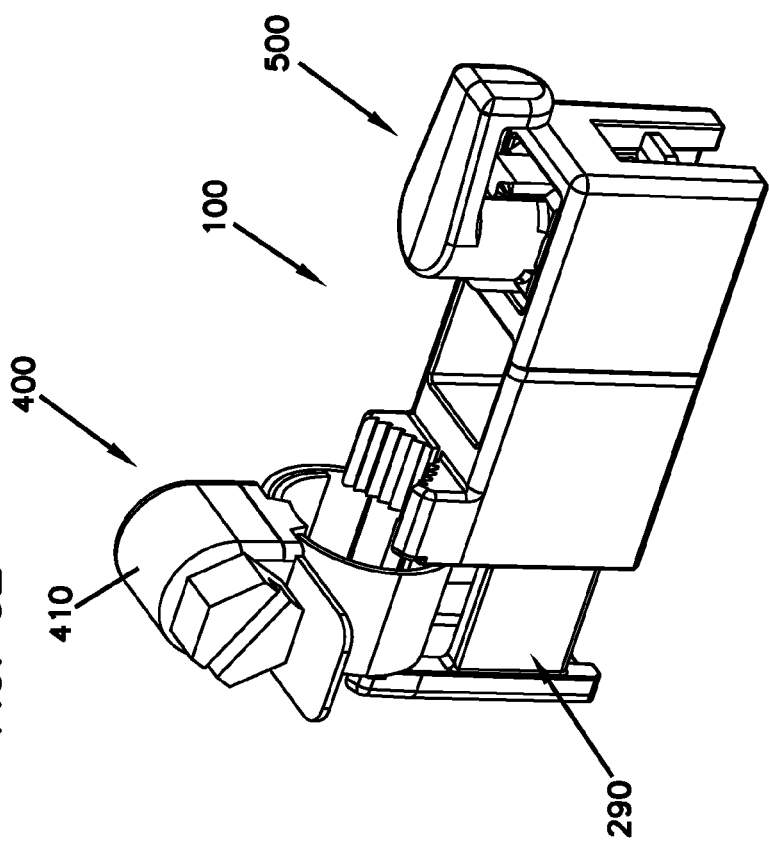
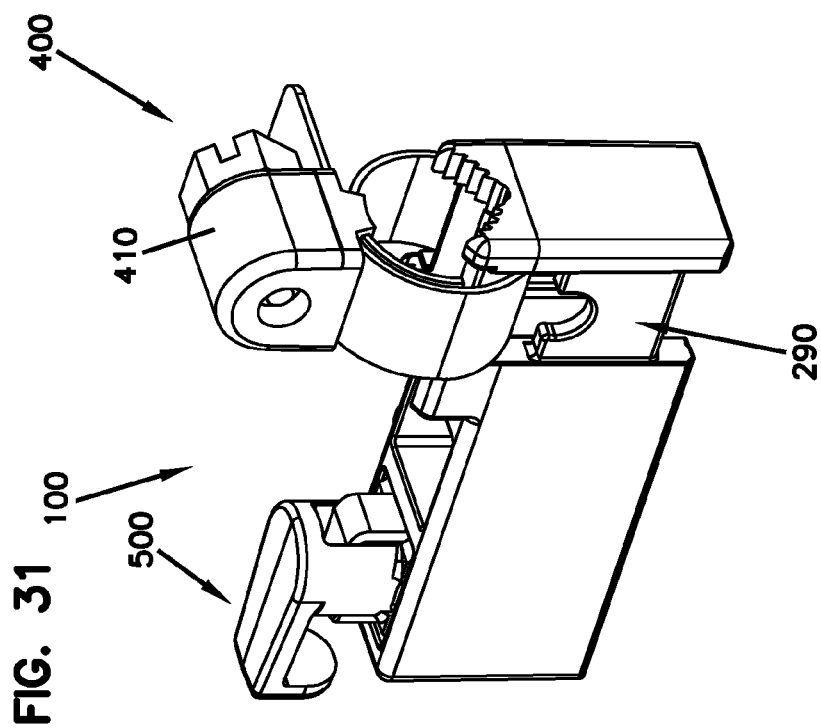

MODULARIZED CABLE TERMINATION UNIT

CROSS-REFERENCE TO RELATED APPLICATION

This application is a National Stage Application of PCT/EP2018/059760, filed on Apr. 17, 2018, which claims the benefit of U.S. Patent Application Ser. No. 62/486,199, filed on Apr. 17, 2017, the disclosures of which are incorporated herein by reference in their entireties. To the extent appropriate, a claim of priority is made to each of the above disclosed applications.

BACKGROUND

Telecommunications system typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters, and wave division multiplexers.

It is often preferred for telecommunications enclosures to be re-enterable. The term re-enterable means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to reseal the enclosures. Other telecommunications enclosures take the form of elongated sleeves formed by wrap around covers or half-shells having longitudinal edges that are joined by clamps or other retainers. Still other telecommunications enclosures include two half-pieces that are joined together through clamps, wedges or other structures. Telecommunications enclosures are typically sealed to inhibit the intrusion of moisture or other contaminants.

In certain applications, telecommunications enclosures include cable termination units for clamping cables relative to the enclosures. Such cable termination units can retain cables in different ways, and it is desirable to provide cable termination units capable of being used with various methods for clamping cables during installation.

SUMMARY

In general terms, the present disclosure relates to a cable termination unit, and a telecommunications enclosure employing one or more cable termination units.

In one aspect, an apparatus is configured to clamp a cable separately from a telecommunications closure and then mounted to the telecommunications closure. The apparatus may include a body extending in a first direction and configured to support a cable extending in the first direction. The body may include a closure mount portion configured to mount the body to a telecommunications closure, a strength member clamp portion configured to fasten a strength member of the cable, and a jacket clamp portion spaced apart from the strength member clamp portion in the first direction. The jacket clamp portion may include a jacket seat portion on which a jacket of the cable is seated, a first cavity configured to at least partially receive a first jacket mount device in a second direction perpendicular to the first direction, and a first strap slot being in communication with the first cavity. The first jacket mount device may include a first jacket strap configured to fasten the jacket on the jacket seat portion. The first strap slot may allow the first jacket strap to pass therethrough and partially extend above the jacket seat portion. The jacket clamp portion may further include a second strap slot extending in a third direction perpendicular to the first direction and the second direction and configured to receive a second jacket mount device configured to fasten the jacket on the jacket seat portion. The apparatus can be referred to as a cable termination unit.

In certain examples, the apparatus may further include the first jacket mount device including the first jacket strap. In certain examples, the first jacket strap is extendable around the jacket and configured to form a loop portion, a first non-loop portion, and a second non-loop portion. The loop portion surrounds the jacket, and the first non-loop portion and the second non-loop portion cooperatively define a coextensive portion extending from the loop portion. The first jacket mount device may further include a first block received in the first cavity and configured to receive the coextensive portion of the first jacket strap through the first strap slot, and a first fastener configured to fix the first jacket strap to the first block.

In certain examples, the body has a forward end and a rearward end in the first direction, and has a top portion, a bottom portion, a first side portion, and an opposite second side portion. The top, bottom, first side, and second side portions extend between the forward end and the rearward end. The second strap slot includes a first opening defined in the first side portion and a second opening defined in the second side portion and corresponding to the first opening such that a second jacket strap of the second jacket mount device passes through the first opening and the second opening to wrap and support the jacket on the jacket seat portion. In certain examples, the first opening and the second opening are in communication with the first cavity.

In certain examples, the body further includes a third opening for engaging the first fastener through the body. In certain examples, the body further includes a third opening formed in the first side portion of the body. The third opening is configured to engage the first fastener through the first side portion of the body in the third direction.

In certain examples, the first jacket mount device may further include a second fastener configured to tighten the first jacket strap around the jacket. The second fastener may be engaged in the second direction.

In certain examples, the loop portion is adjustable to accommodate different diameters for the jacket. In certain examples, the jacket seat portion is configured as a V-shape for generally complementing a shape of the jacket of the cable. In certain examples, the jacket seat portion includes a grooved surface.

In certain examples, the jacket clamp portion includes a strap storage area for storing a portion of the first jacket strap which extends from the body.

In certain examples, the strap storage area may include a first strap receiving area formed on the first side portion of the body. The first strap receiving area is recessed from the first side portion of the body. In addition or alternatively, the strap storage area may include a second strap receiving area formed on the second side portion of the body. The second strap receiving area is recessed from the second side portion of the body.

In another aspect, a method is provided for mounting a cable to a telecommunications closure. The method may include clamping a cable with the apparatus as described above, and mounting the apparatus to the telecommunications closure.

In certain examples, the step of clamping a cable may include fixing a jacket of the cable to the jacket clamp portion of the body by fastening the jacket with the first jacket strap and engaging the first jacket strap through the first strap slot, and fixing a strength member of the cable to the strength member clamp portion of the body.

In certain examples, the step of clamping a cable may include fixing a jacket of the cable to the jacket clamp portion of the body by fastening the jacket with the second jacket mount device and engaging the second jacket mount device through the second strap slot, and fixing a strength member of the cable to the strength member clamp portion of the body.

In yet other aspect, a telecommunications enclosure may include a cover, a cable organizer, a seal block assembly, and at least one cable termination unit. The cover defines an interior space and having an open end. The cable organizer is configured to manage cables. The cable termination unit is configured to be mounted to the seal block assembly. The cable termination unit may include a first jacket mount device including a first jacket strap configured to fasten a cable jacket, a second jacket mount device configured to fasten the cable jacket, and a body extending in a first direction and configured to support a cable extending in the first direction. The body may include a strength member clamp portion configured to fasten a strength member of the cable, and a jacket clamp portion spaced apart from the strength member clamp portion in the first direction. The jacket clamp portion may include a jacket seat portion on which a jacket of the cable is seated, a first cavity configured to at least partially receive the first jacket mount device in a second direction perpendicular to the first direction, a first strap slot being in communication with the first cavity and allowing the first jacket strap to pass therethrough and partially extend above the jacket seat portion, a second strap slot extending in a third direction perpendicular to the first direction and the second direction and configured to receive a second jacket mount device.

In certain examples, the first jacket mount device and the second jacket mount device are selectively used with the cable termination unit. In certain examples, the telecommunications enclosure may further include a plurality of cable termination unit holders, each configured to hold the cable termination unit and retained to the seal block assembly.

In yet another aspect, an apparatus is configured to clamp a cable separately from a telecommunications closure and then mounted to the telecommunications closure, The apparatus may include a body configured to support a cable. The body includes a closure mount portion configured to mount the body to a telecommunications closure, and a jacket clamp portion spaced apart from the strength member clamp portion in the first direction. The jacket clamp portion may include a jacket seat portion a first strap slot, and a strap storage area. The jacket seat portion provides an area on which a jacket of the cable is seated. The first strap slot is in communication with the first cavity and allows a first jacket strap to pass therethrough and partially extend above the jacket seat portion. The strap storage area is configured to store a portion of the first jacket strap which extends from the body.

In certain examples, the apparatus further includes the first jacket strap that is adjustable for different jacket diameters. In certain examples, the body extends in a first direction in which the cable is arranged on the body. In certain examples, the apparatus further includes a first jacket mount device including a first block. The jacket clamp portion may include a first cavity configured to at least partially receive the first jacket mount device in a second direction perpendicular to the first direction, and the first jacket strap may mount to the first block and configured to fasten the jacket on the jacket seat portion.

In certain examples, the strap storage area includes a first strap receiving area formed on one side of the body and recessed from the one side of the body. In certain examples, the strap storage area further includes a second strap receiving area formed on the other side of the body and recessed from the other side of the body.

In certain examples, the jacket clamp portion may include a second strap slot extending in a third direction perpendicular to the first direction and the second direction and configured to receive a second jacket mount device configured to fasten the jacket on the jacket seat portion.

In certain examples, the jacket clamp portion may include a strength member clamp portion configured to fasten a strength member of the cable.

In yet other aspects, an apparatus is configured to clamp a cable separately from a telecommunications closure and then mounted to the telecommunications closure. The apparatus includes a body extending in a first direction and configured to support a cable extending in the first direction. The body includes a closure mount portion configured to mount the body to a telecommunications closure, and a jacket clamp portion spaced apart from the strength member clamp portion in the first direction. The jacket clamp portion may include a jacket seat portion and a strap slot. The jacket seat portion provides an area on which a jacket of the cable is seated. The jacket seat portion supports the jacket of the cable in a second direction perpendicular to the first direction. The strap slot extends in a third direction perpendicular to the first direction and the second direction and is configured to receive a jacket strap configured to fasten the jacket on the jacket seat portion. In certain examples, the jacket seat portion is configured as a V-shape for generally complementing a shape of the jacket of the cable. In certain examples, the jacket clamp portion includes a strength member clamp portion configured to fasten a strength member of the cable.

BRIEF DESCRIPTION OF THE DRAWINGS

FIG. 24 illustrates a first jacket strap of the first jacket mount device.

FIG. 31 is a perspective view of the cable termination unit with a second jacket mount device.

FIG. 32 is another perspective view of the cable termination unit with the second jacket mount device of FIG. 31.

DETAILED DESCRIPTION

Figure 1:
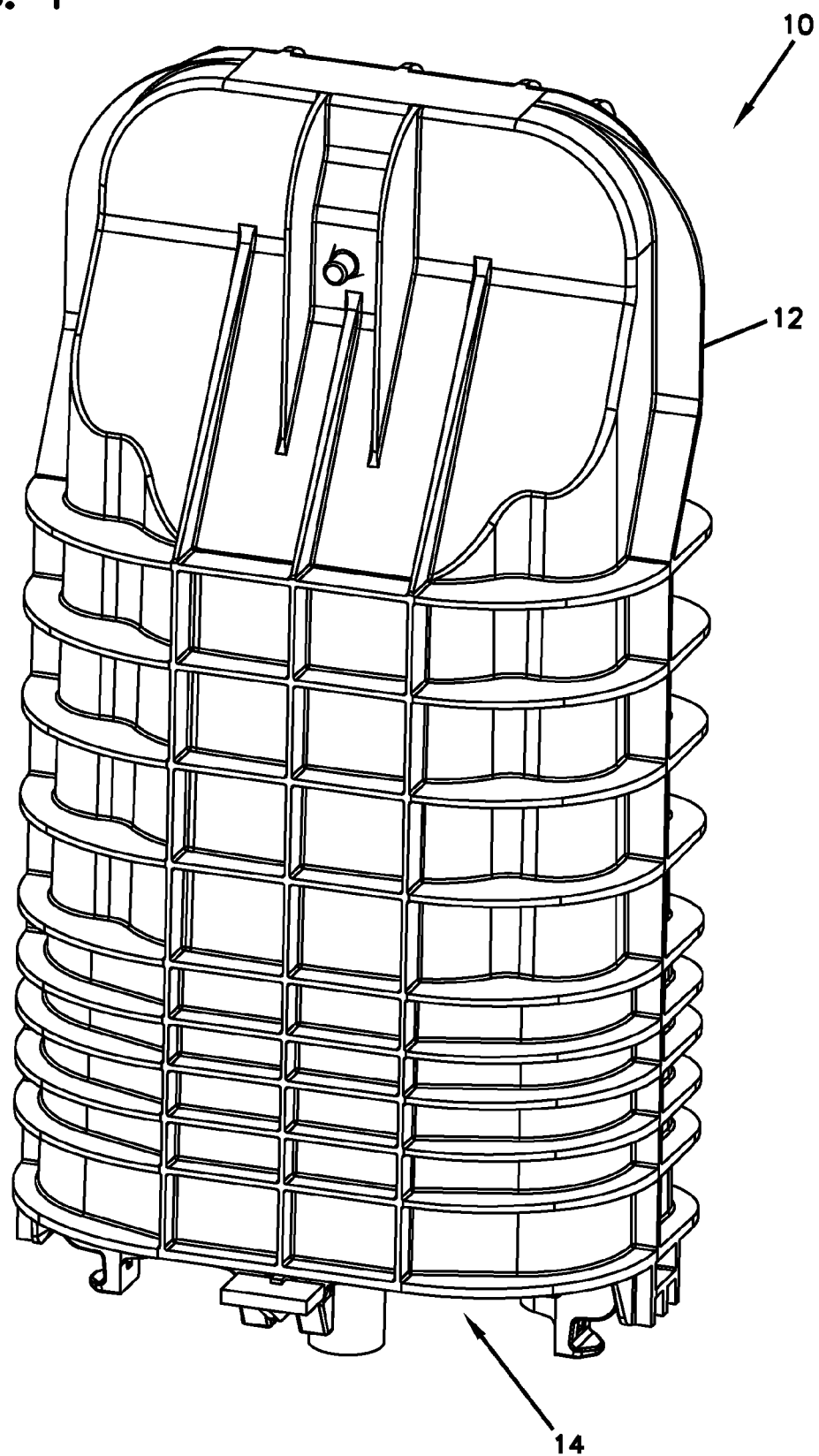
FIG. 1 is an example embodiment of a telecommunications enclosure.

Various embodiments will be described in detail with reference to the drawings, wherein like reference numerals represent like parts and assemblies throughout the several views.

Referring to FIGS. 1-5, an example telecommunications enclosure 10 for managing cables is described. In this document, the telecommunications enclosure can be also referred to as the closure. The closure 10 is configured to be re-enterable and thus can be reopened to allow access to telecommunications components housed therein without requiring removal and destruction of the closure.

Figure 2:
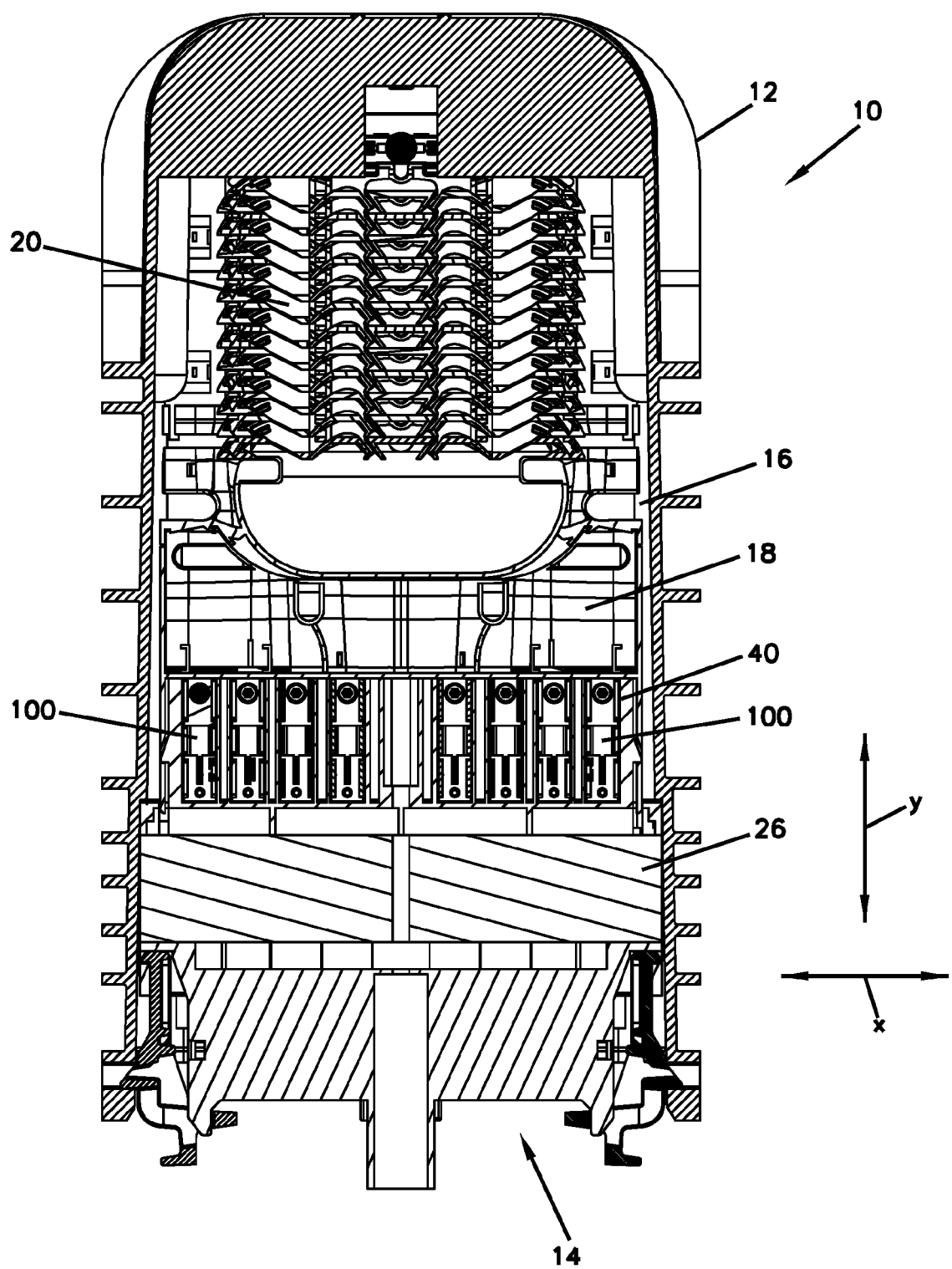
FIG. 2 is a front cross sectional view of the telecommunications enclosure of FIG. 1.
Figure 3:
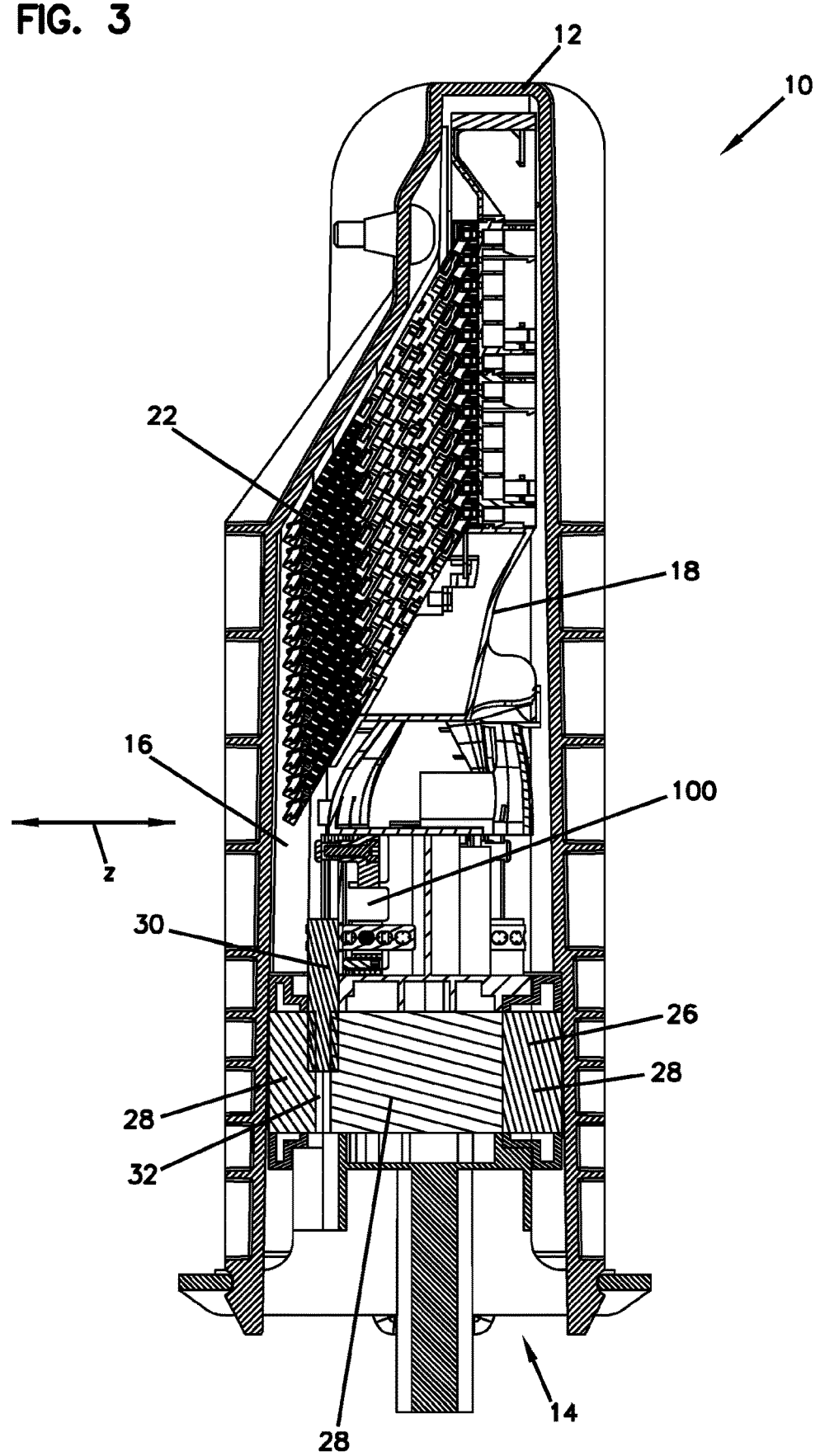
FIG. 3 is a side cross sectional view of the telecommunications enclosure of FIG. 1.

The closure 10 includes a cover 12 with an open end 14. As shown in FIGS. 2 and 3, the cover 12 defines an interior space 16 to receive an equipment frame 18 through the open end 14 of the cover 12. In some examples, the cover 12 is shaped as a dome-configuration. Other configurations are also possible in other examples. The equipment frame 18 has various structures for holding telecommunications equipment 20, such as a plurality of trays 22. Each of the trays 22 can be pivotably supported by the equipment frame 18 so that, when the cover 12 is removed, the trays 22 are individually accessible on the equipment frame 18.

The closure 10 further includes a seal block assembly 26 configured to seal the interior space 16. The seal block assembly 26 is configured to provide a seal around cables 30 entering and exiting the closure 10. In certain examples, the seal block assembly 26 provides cable openings 32 through which the cables 30 enter and exit the closure 10 while providing proper sealing around the cables. In some examples, the seal block assembly 26 includes a plurality of seal block pieces 28 which are made of gels.

In some cases, when the cables 30 entering or exiting the closure 10 can be positioned within the interior space 16, the cables 30 can be misaligned with the cable openings 32 of the seal block assembly 26. Such misalignment can create a possible leak source into the closure 10. As described herein, a cable termination unit 100 of the present disclosure is configured to compensate such misalignment and prevent leakage through the seal block assembly 26. Examples of the cable termination unit 100 are described with reference to FIGS. 13-33.

The closure 10 can further include one or more cable termination unit holders 40 for holding cable termination units 100. In the illustrated example of FIGS. 1-5, the cable termination unit holders 40 are configured as pockets 42 in the equipment frame 18 so that the cable termination units 100 are directly received and retained in the pockets 42. The cable termination unit holders 40 further include retaining elements, such as clips, for holding the cable termination units 100 in the pockets 42. As described herein, the cables 30 (and/or the cable termination units 100) are movable as necessary to centralized and align with the cable openings of the seal block assembly 26 in the Z direction.

Figure 4:
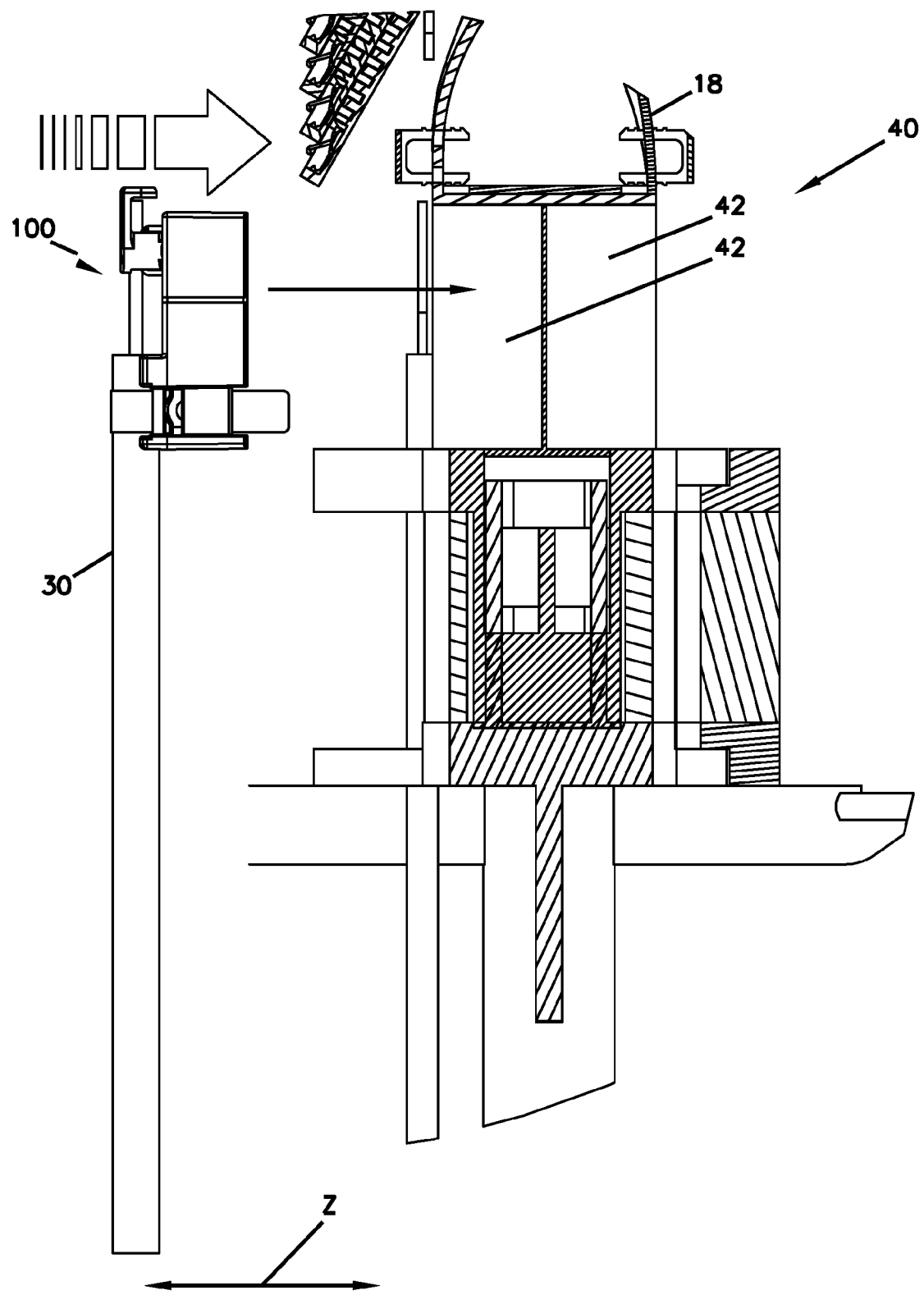
FIG. 4 illustrates a cable termination unit being mounted to the telecommunication enclosure.
Figure 5:
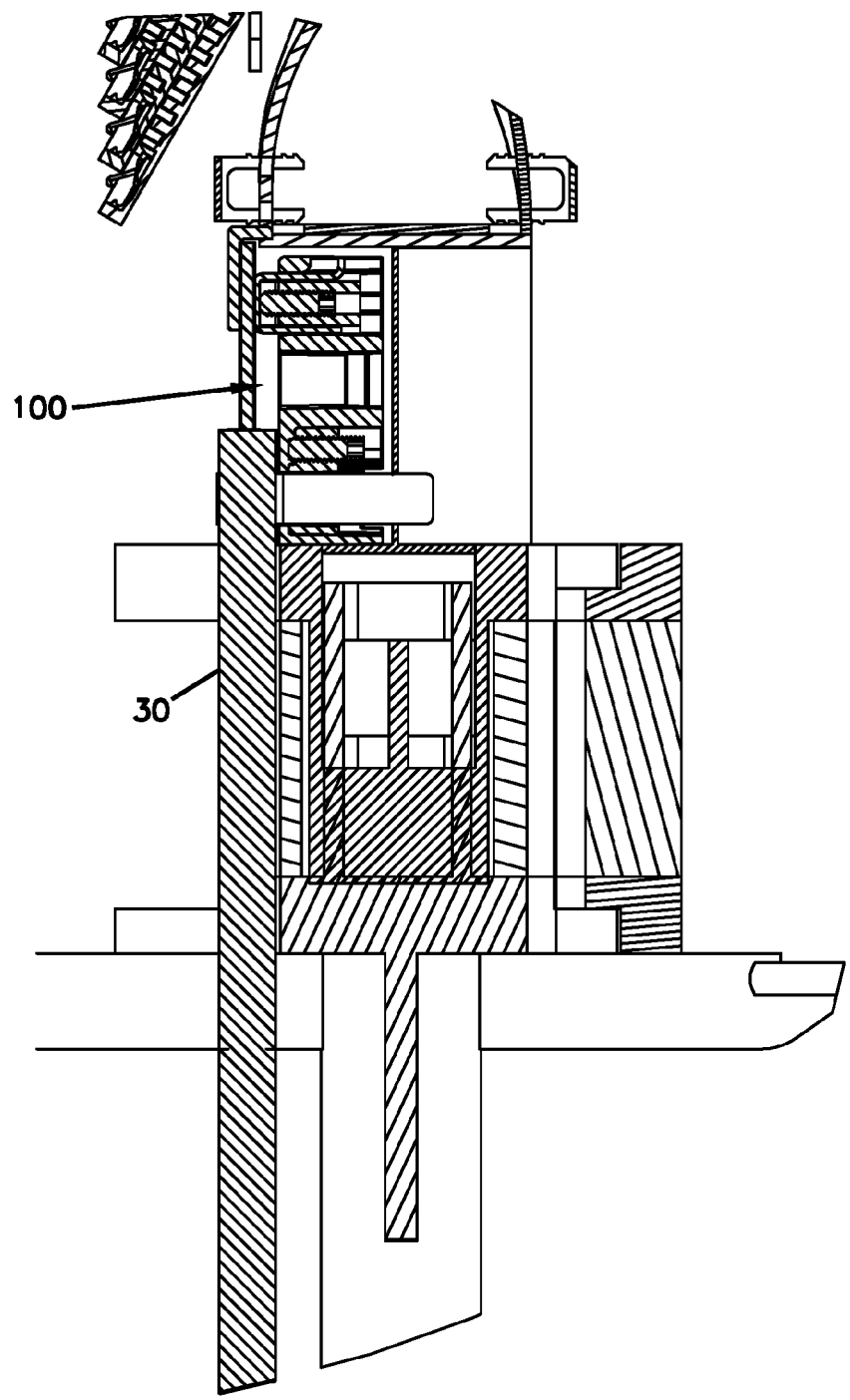
FIG. 5 illustrates the cable termination unit of FIG. 4 that has been mounted to the telecommunications enclosure.
Figure 6:
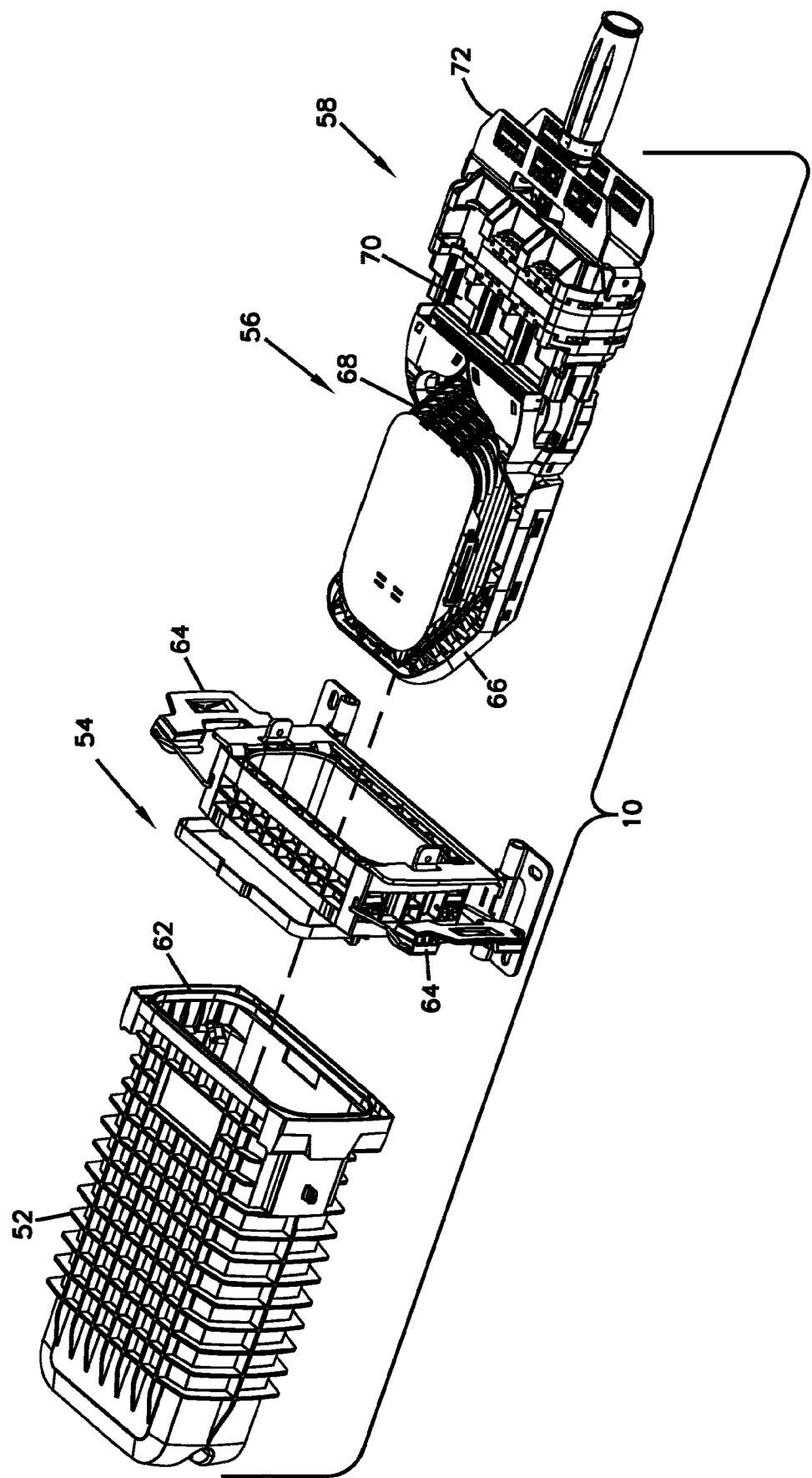
FIG. 6 is an exploded view of another example embodiment of a telecommunications enclosure.
Figure 7:
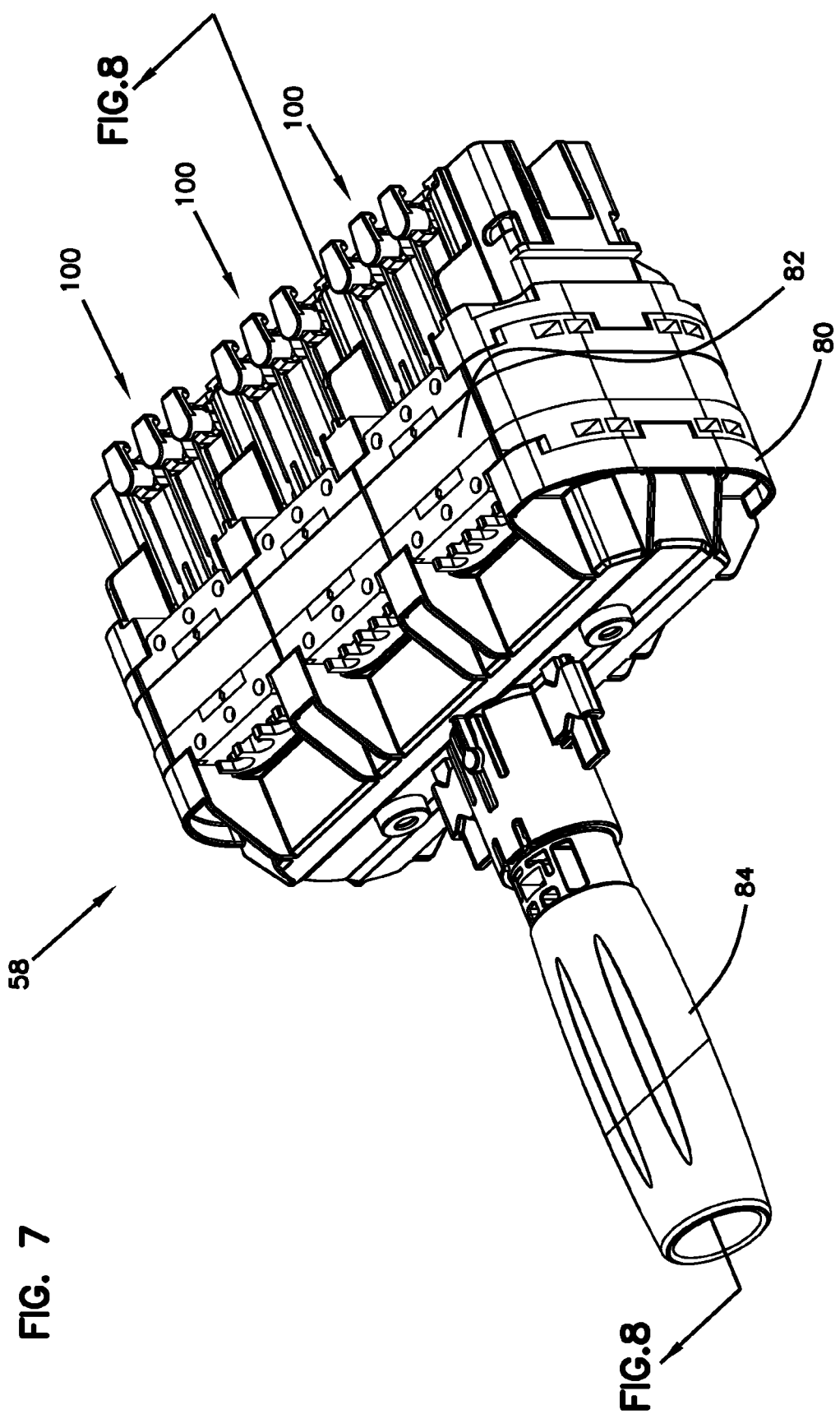
FIG. 7 is a perspective view of an example embodiment of a seal block assembly in the telecommunications enclosure of FIG. 7.
Figure 8:
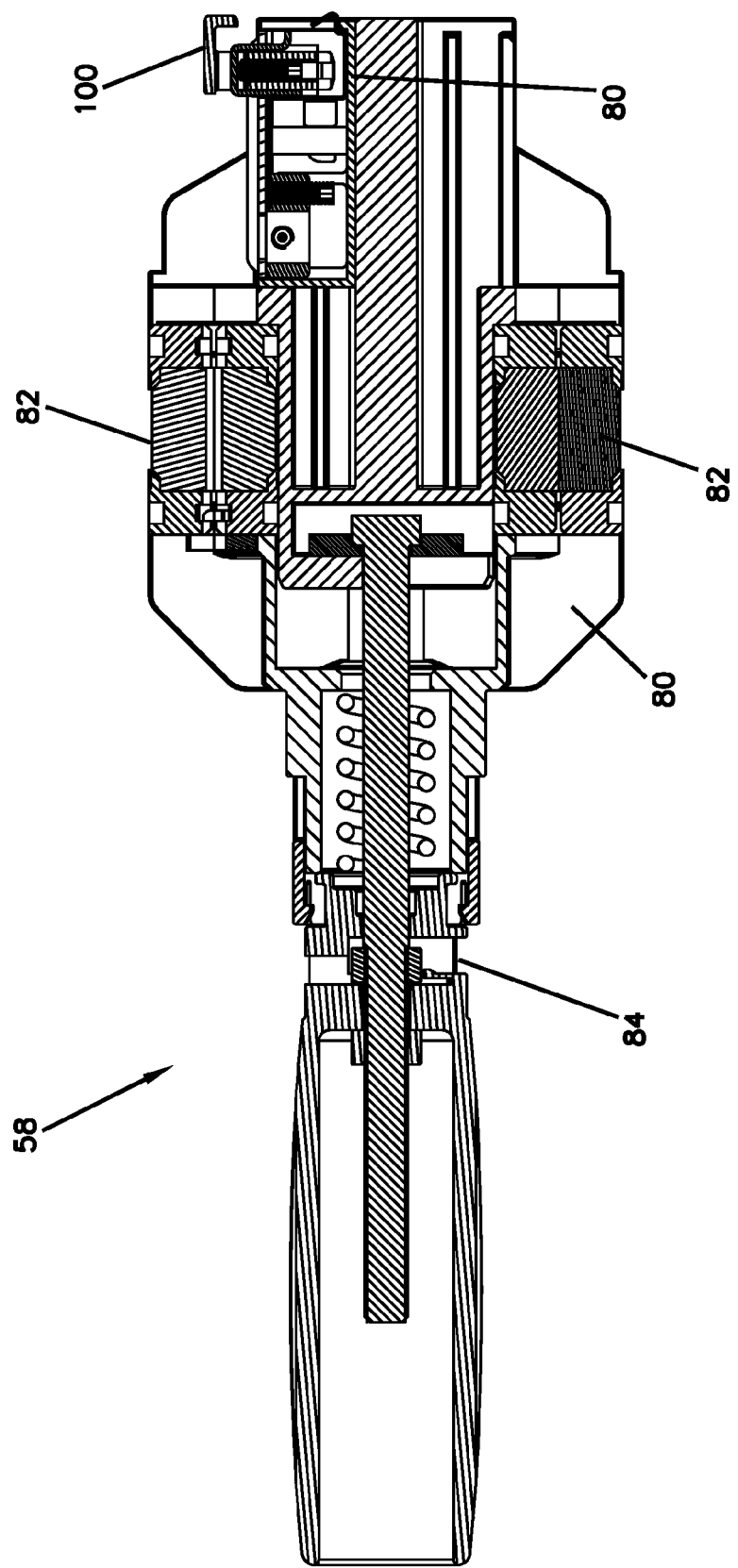
FIG. 8 is a cross sectional view of the seal block assembly of FIG. 7.
Figure 9:
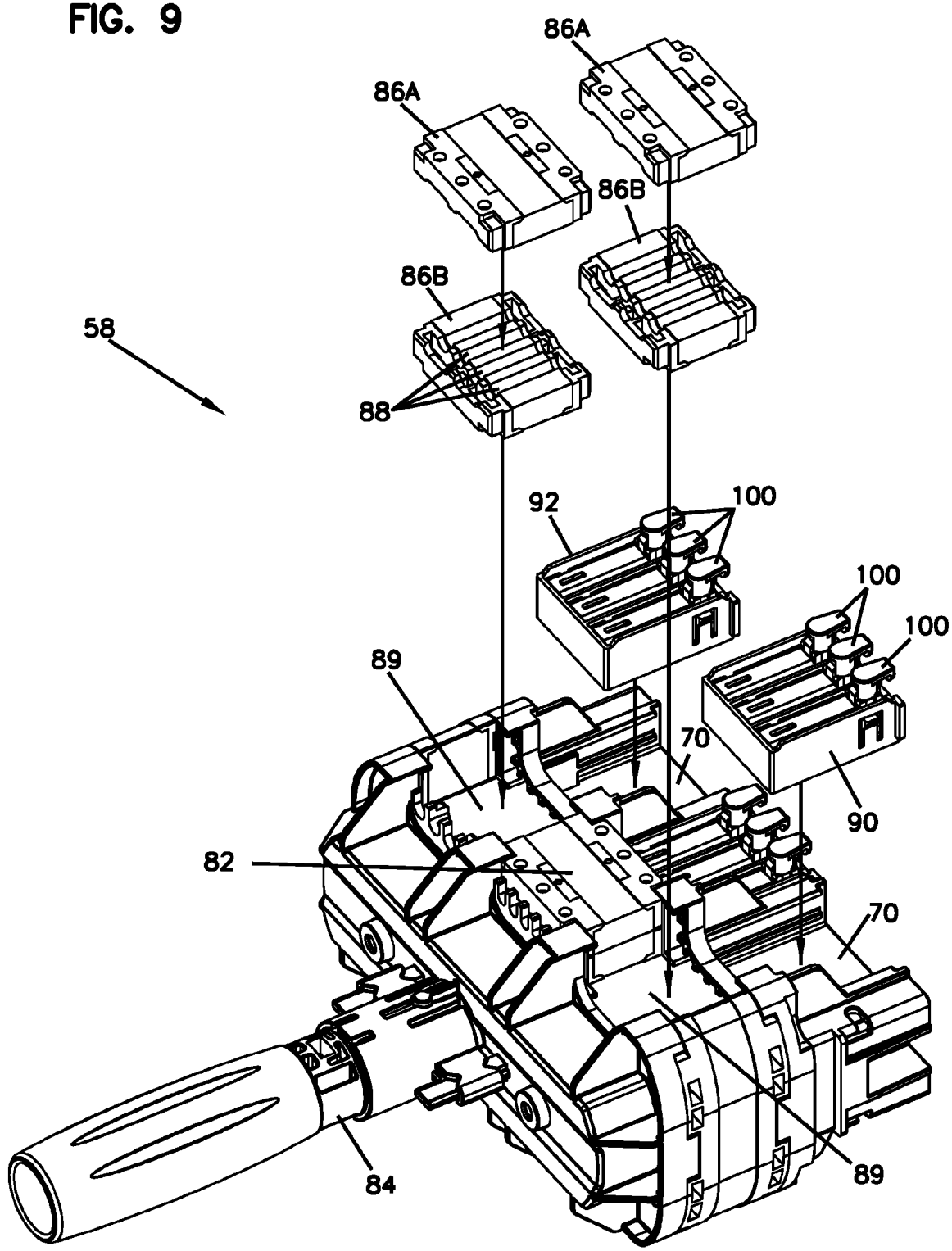
FIG. 9 is a partial exploded view of the seal block assembly of FIG. 7.

As described herein, cables 30 are retained with the closure 10 by first attaching the cables 30 to the cable termination units 100 and then mounting the cable termination units 100 to the equipment frame 18. As shown in FIGS. 4 and 5, once the cable termination unit 100 is assembled with the cable 30, the cable termination unit 100 is placed and retained in the pocket 42 of the cable termination unit holder 40.

Referring to FIGS. 6-12, another example telecommunications enclosure 10 for managing cables is described. Similarly to the closure 10, the closure 10 is configured to be re-enterable and thus can be reopened to allow access to telecommunications components housed therein without requiring removal and destruction of the closure.

The closure 10 includes a cover 52, a base 54, a cable organizer 56, and a seal block assembly 58. The cover 52 has an open end 62. The base 54 mounts to the cover 52 with fasteners 64, such as latches. A seal can be provided between the base 54 and the cover 52 when assembled. The cable organizer 56 is configured to manage cables 30 and has various functions such as slack storage, splicing, and splitting of cables. The seal block assembly 58 can be attached to the cable organizer 56, and the cables 30 enter and exit the cable organizer 56 through the seal block assembly 58. When the cable organizer 56 is assembled with the seal block assembly 58, the cable organizer 56 is inserted into the cover 52 and the seal block assembly 58 seals to the base 54 to seal the interior of the enclosure 10. The cable organizer 56 includes an equipment frame 66 configured to support various elements, such as a plurality of trays 68, on the cable organizer 56. An example of the cable organizer 56 is described in PCT Application No. PCT/EP2013/055989, titled TELECOMMUNICATIONS ENCLOSURE AND ORGANIZER, the entirety of which is hereby incorporated by reference. In some examples, the seal block assembly 58 includes cable fixation areas 70, 72. In addition to the cable termination units 100 according to the present disclosure, other examples of the cable termination units which can be used with the cable organizer 56 are described in PCT/EP2013/056066, titled CABLE CLAMP AND TELECOMMUNICATIONS ENCLOSURE, the entirety of which is hereby incorporated by reference.

As shown in FIGS. 7-10, the seal block assembly 58 includes a sealing unit 80 and cable sealing modules 82 for sealing to cables entering the closure 10. The seal block assembly 58 further includes an actuator or trigger 84 which, when activated (e.g., by turning), causes the sealing unit 80 to seal to the cables. The cable termination units 100 are retained in the seal block assembly 58 and clamp the cables to the seal block assembly 58.

In the illustrated example, each of the cable sealing modules 82 includes two seal block pieces 86A and 86B which mate together and define cable openings 88 through which the cables 30 enter and exit the closure 10 while providing sealing around the cables. The cable sealing modules 82 are received and retained on seal block holding areas 89 of the seal block assembly 58. The seal block holding areas 89 are arranged adjacent the cable fixation areas 70 for retaining the cable termination units 100.

Figure 10:
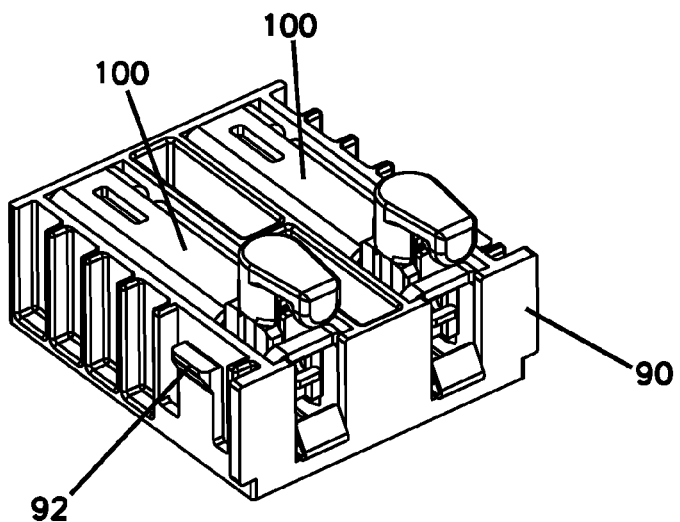
FIG. 10 illustrates an example embodiment of a cable termination unit holder used with the seal block assembly of FIG. 7.
Figure 11:
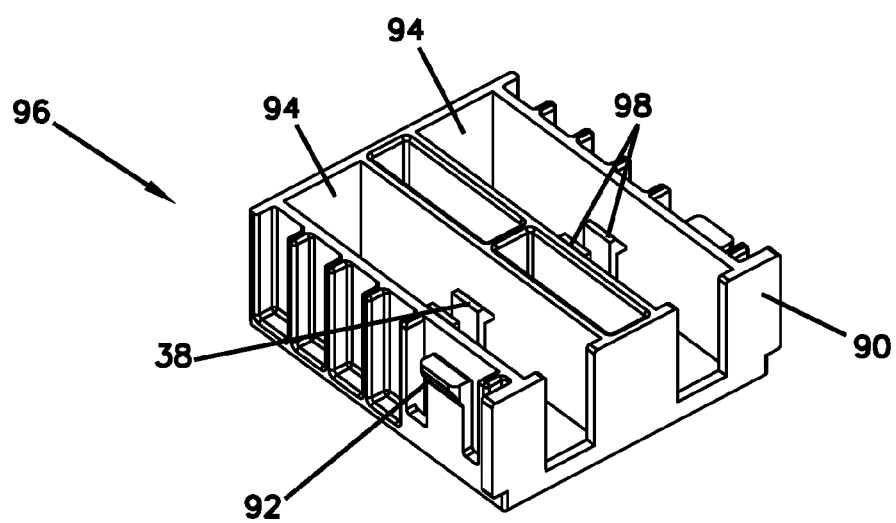
FIG. 11 illustrates the cable termination unit holder without cable termination units.
Figure 12:
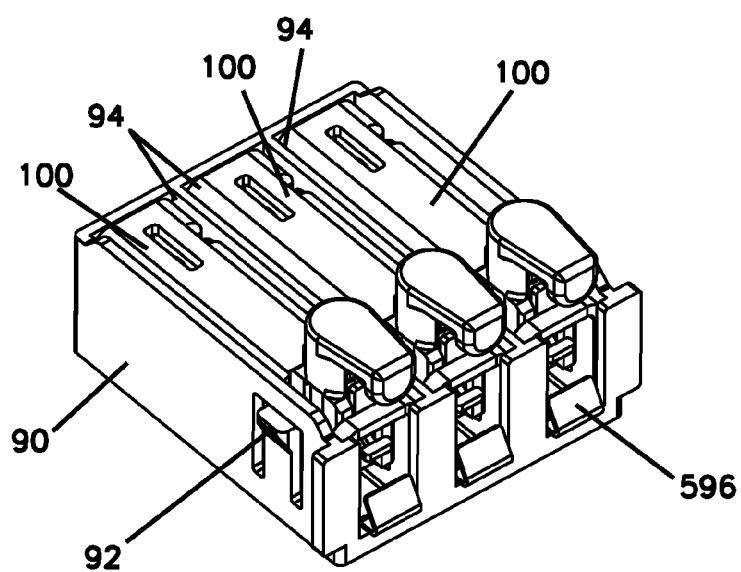
FIG. 12 illustrates another example embodiment of a cable termination unit holder used with the seal block assembly of FIG. 7.

In some examples, the cable termination units 100 are held in the seal block assembly 58 using cable termination unit holders 90. In this example, the cable termination unit holders 90 are configured as separate units, which are received into the cable fixation areas 70 of the seal block assembly 58. Various embodiments of the cable termination unit holder 90 are shown in FIGS. 10-12.

The cable termination unit holder 90 can fit to the seal block assembly 58 in various methods. In one example, the cable termination unit holder 90 is received on the cable fixation area 70 and snap-fits to the seal block assembly 58 with clips 92. The cable termination unit holder 90 includes one or more pockets 94 for receiving the cable termination unit 100. The embodiment of FIGS. 10 and 11 shows that two pockets 94 are provided in the cable termination unit holder 90, and the embodiment of FIG. 12 shows that three pockets 94 are provided in the cable termination unit holder 90.

The cable termination unit holder 90 can include a cable termination unit fastener 96 or retaining the cable termination unit 100 within the pocket 94. In the illustrated example, the fastener 96 includes a pair of clip arms 98 which mount to corresponding features (e.g., flanges 282 (FIGS. 15-21) or apertures) of the cable termination unit 100.

Although two embodiments of the closure 10 are described in FIGS. 1-12 to be used with the cable termination unit 100 in accordance with the present disclosure, it is understood that the cable termination unit 100 can be used with any other types of closures.

Figure 13:
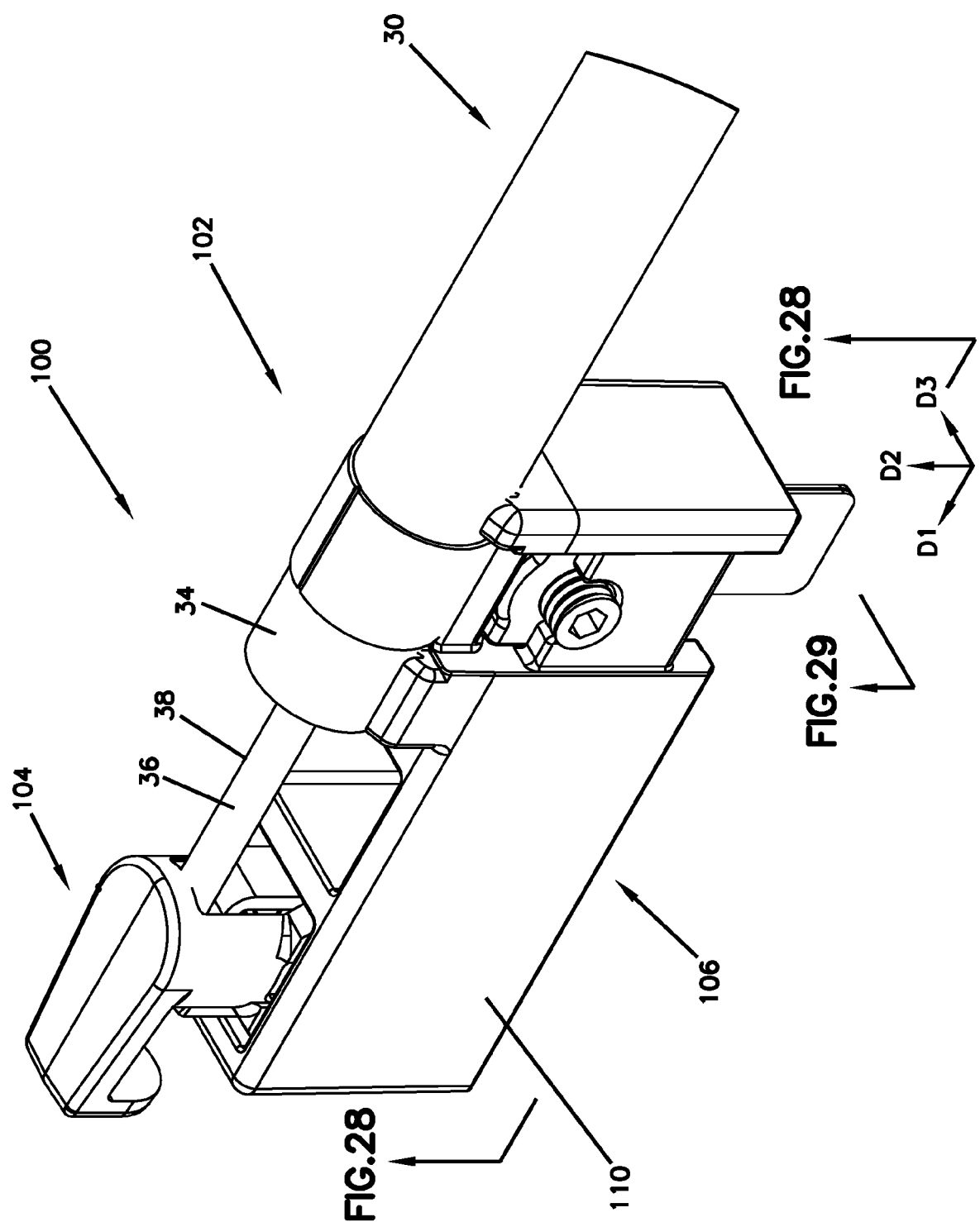
FIG. 13 is a perspective view of an exemplary embodiment of a cable termination unit in accordance with the present disclosure.
Figure 14:
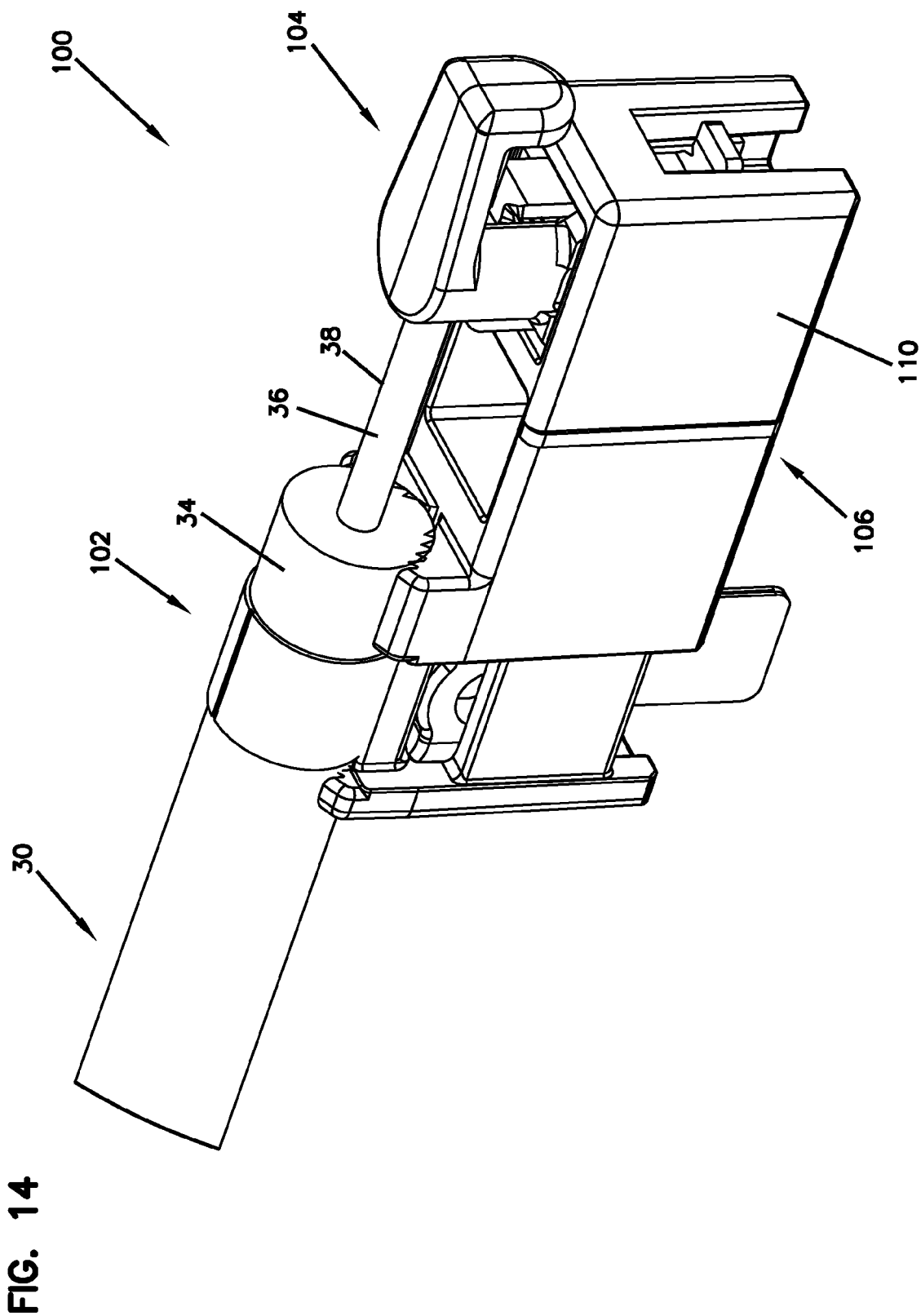
FIG. 14 is another perspective view of the cable termination unit of FIG. 13.
Figure 15:
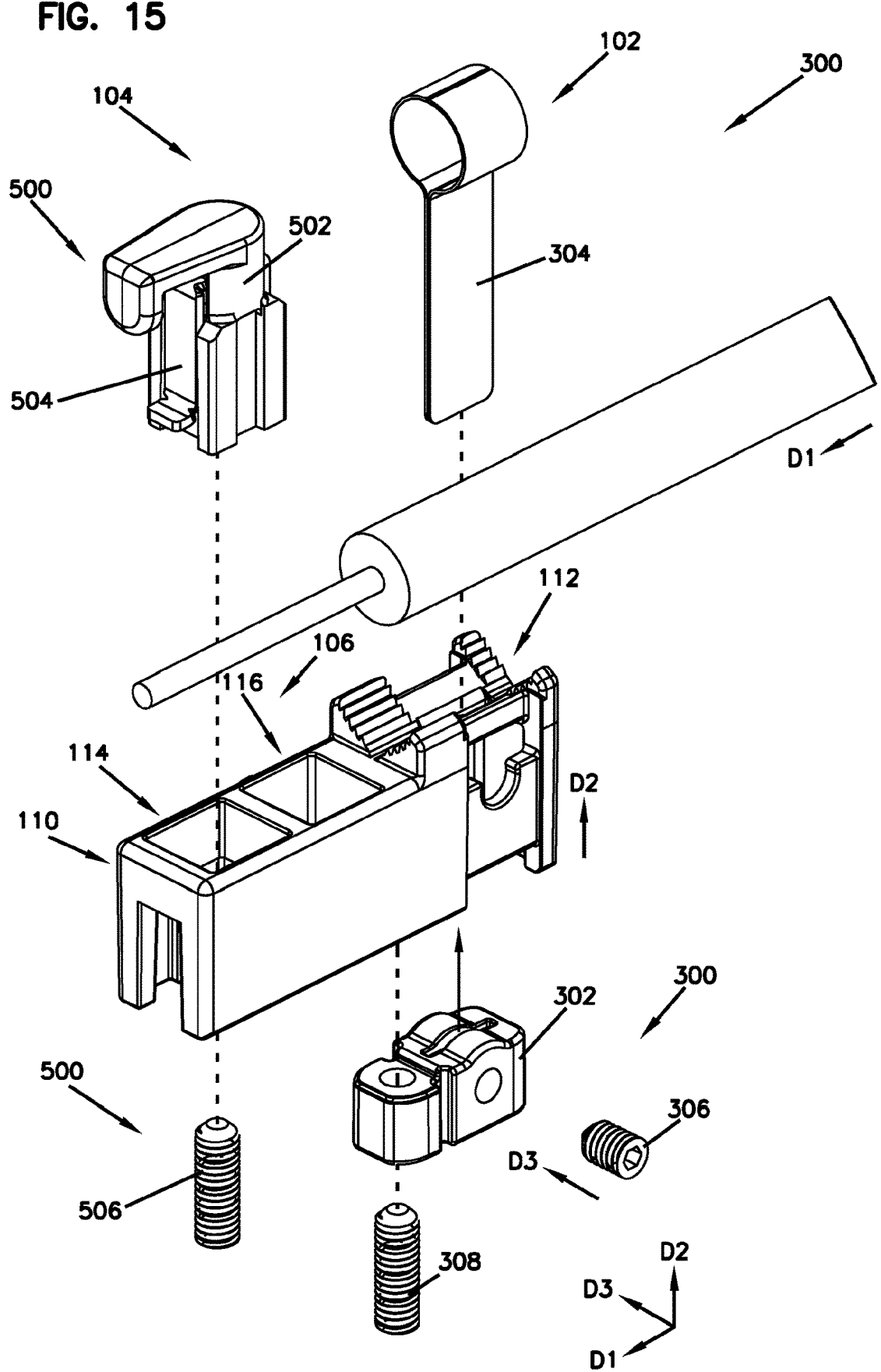
FIG. 15 is an exploded view of the cable termination unit of FIG. 13.
Figure 16:
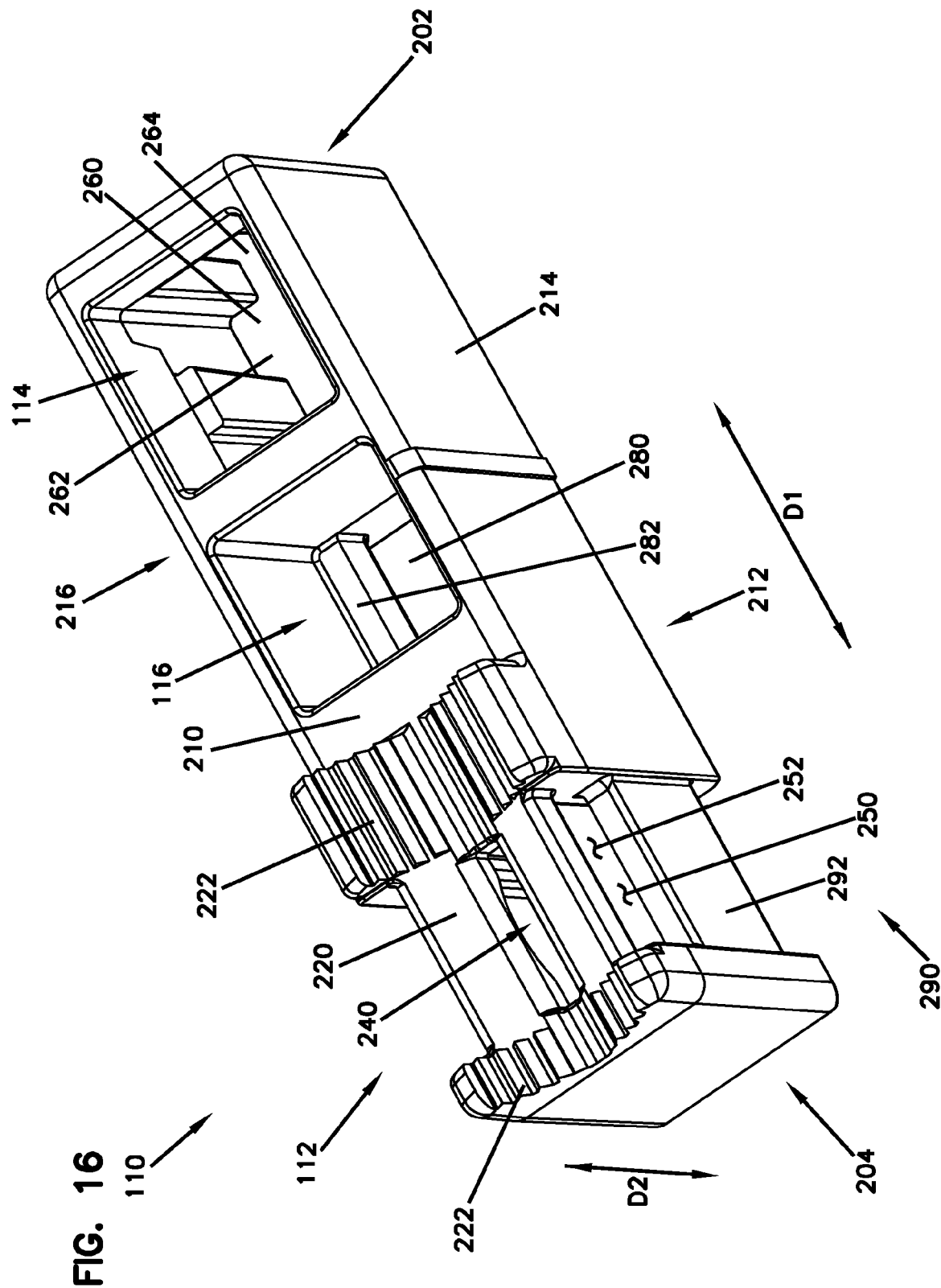
FIG. 16 is a perspective view of an exemplary embodiment of a body of the cable termination unit of FIG. 13.
Figure 17:
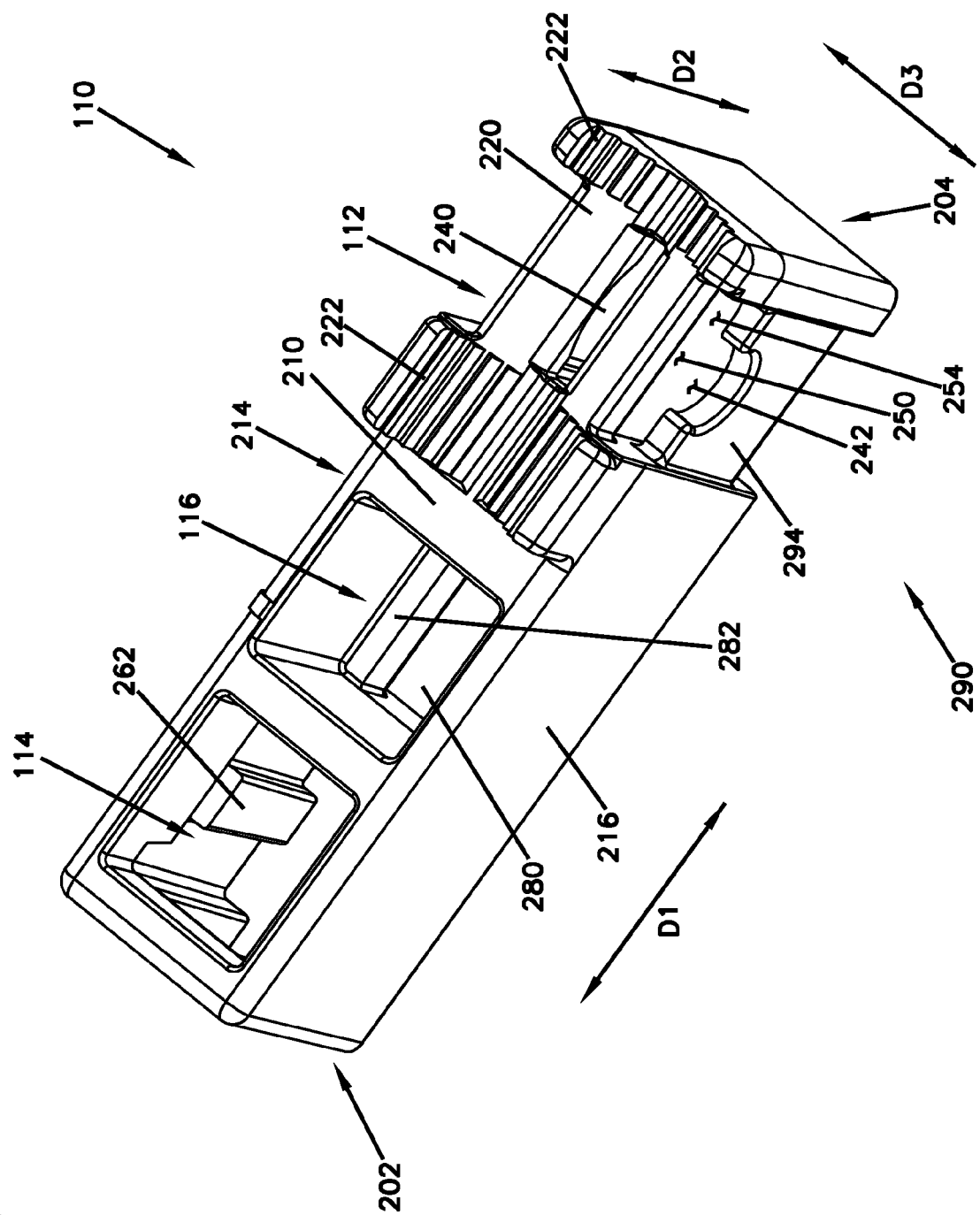
FIG. 17 is another perspective view of the body of the cable termination unit of FIG. 16.

Referring now to FIGS. 13-15, an example cable termination unit 100 is described. The cable termination unit 100 is configured to clamp a cable 30 and be retained by the closure 10 using, for example, the cable termination unit holder 40, 90. In this document, the cable termination unit 100 is also referred to as a cable clamp, cable clamping assembly, device, or unit, or the like. As described herein, the cable termination unit 100 enables users or technicians to clamp cables outside and separately from the closure before insertion into the closure.

Each cable 30, which enters and exits the closure 10 and is managed within the closure 10, includes one or more fiber optic cables (not depicted), a cable jacket 34, and one or more strength members 36. The fiber optic cables can be tubes containing optical fibers. The cable jacket 34 surrounds the fiber optic cables. The strength members 36 are used to increase the tensile force that is applied on the cable during installation. The strength members can take the pulling force and keep the fibers safe during installation. In certain examples, the strength members 36 include a central strength member 38 which can be made from fiberglass or plastic. One example of the central strength member is made of a glass-filled rod. In addition or alternatively, the strength members 36 can include a bundle of flexible strength members or yarns which enclose a jacketed fiber. For example, such flexible strength members are made of fibrous polymer, such as aramid. Although the cable 30 is primarily described as a fiber optic cable, the present disclosure is also applicable to other types of cables, such as copper cables.

In this example, the cable termination unit 100 includes a jacket clamp assembly 102, a strength member clamp assembly 104, and a cable termination unit mounting device 106. The jacket clamp assembly 102 is configured to fix the cable jacket 34 relative to the closure 10. As described herein, the jacket clamp assembly 102 is configured to allow for floating of the cable relative to a fixed portion of the closure 10, such as the equipment frame 18 or the seal block assembly 58, so that the cable is centralized and aligned with the seal block of the closure 10 as desired. The jacket clamp assembly 102 is further configured to clamp cable jackets of different sizes.

The strength member clamp assembly 104 is configured to fix the strength member 36, such as the central strength member 38, relative to the closure 10. Similarly to the jacket clamp assembly 102, the strength member clamp assembly 104 is configured to allow for floating of the cable relative to a fixed portion of the closure 10, such as the equipment frame 18 or the seal block assembly 58, so that the cable is centralized and aligned with the seal block of the closure 10 as desired. The strength member clamp assembly 104 is further configured to clamp strength members of different sizes.

The cable termination unit mounting device 106 is configured to mount the cable termination unit 100 to the closure 10. In some examples, the cable termination unit mounting device 106 is engaged with the cable termination unit holder 40, 90 to retain the cable termination unit 100 to the closure 10.

In the illustrated example, the jacket clamp assembly 102, the strength member clamp assembly 104, and the cable termination unit mounting device 106 are integrally formed through a body 110. In other examples, however, at least one of the jacket clamp assembly 102, the strength member clamp assembly 104, and the cable termination unit mounting device 106 is made as a separate body from the others.

As shown in FIG. 15, the cable termination unit 100 includes a body 110 configured to support the cable 30. The body 110 includes a jacket clamp portion 112, a strength member clamp portion 114, and a closure mount portion 116. An example of the body 110 is further described and illustrated with reference to FIGS. 16-21.

Figure 33:
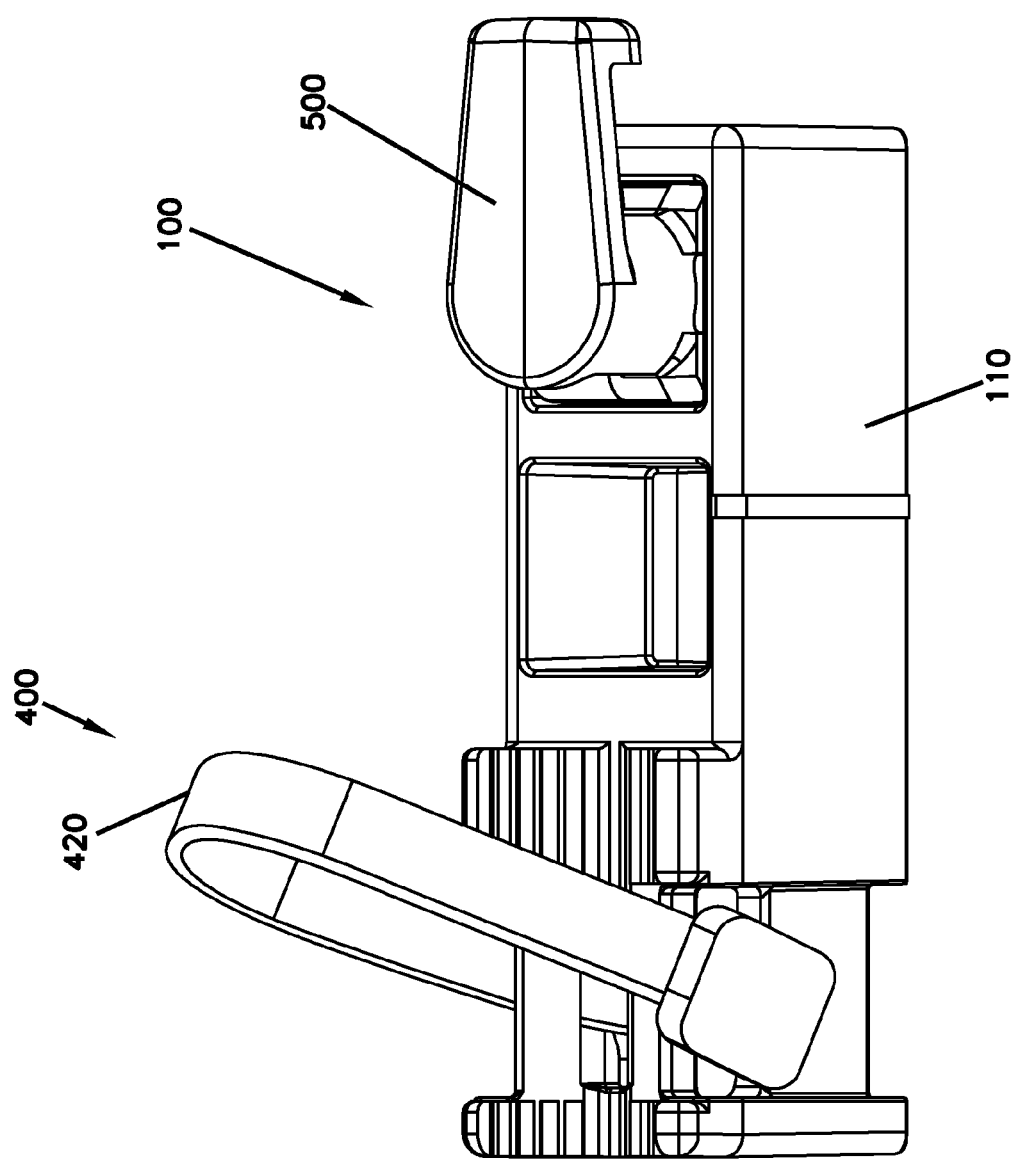
FIG. 33 is a perspective view of the cable termination unit with another second jacket mount device.

In certain examples, the jacket clamp assembly 102 includes the jacket clamp portion 112 of the body 110 and various jacket mount devices, such as a first jacket mount device 300 (FIGS. 13-15 and 28-30) and a second jacket mount device 400 (FIGS. 31-33). In certain examples, the first jacket mount device 300 includes a first body 302, a first jacket strap 304, a first fastener 306, and a second fastener 308. In certain examples, the second jacket mount device 400 includes a second jacket strap 402, such as a hose clamp 410 (FIGS. 31 and 32) or a cable strap or tie 420 (FIG. 33). As described herein, the jacket clamp portion 112 of the body 110 provides various features for interchangeably engaging different jacket mount devices. The first jacket mount device 300 and the second jacket mount device 400 are described in more detail below in connection to the body 110 of the cable termination unit 100.

The strength member clamp assembly 104 includes the strength member clamp portion 114 of the body and various strength member mount devices, such as a first strength member mount device 500 (FIGS. 13-15 and 28-33). In certain example, the first strength member mount device 500 includes a second body 502, a pressing element 504, and a third fastener 506. The first strength member mount device 500 is described in more detail below in connection to the body 110 of the cable termination unit 100. Although the first strength member mount device 500 is primarily described in this example, it is understood that other types of strength member mount devices are used with the body 110.

The cable termination unit mounting device 106 includes the closure mount portion 116 and associated features of the closure 10, such as the cable termination unit holder 40, 90. The closure mount portion 116 is described in more detail below in connection to the body 110 of the cable termination unit 100.

Referring now to FIGS. 16-21, the body 110 of the cable termination unit 100 is described in more detail. The body 110 extends in the same direction D1 (a first direction) as a direction in which the cable 30 extends over the cable termination unit 100. As described herein, the body 110 includes at least part of the jacket clamp assembly 102, at least part of the strength member clamp assembly 104, and at least part of the cable termination unit mounting device 106.

The body 110 has a forward end 202 and a rearward end 204 and extends between the forward end 202 and the rearward end 204 in the first direction D1. The body 110 has a top portion 210, a bottom portion 212, a first side portion 214, and a second side portion 216 opposite to the first side portion 214. All the portions 210, 212, 214 and 216 extend between the forward end 202 and the rearward end 204 in the first direction D1.

In the illustrated example, the jacket clamp portion 112 is arranged adjacent the rearward end 204, and the strength member clamp portion 114 is spaced apart from the jacket clamp portion 112 in the first direction D1 and arranged adjacent the forward end 202. The closure mount portion 116 is arranged between the jacket clamp portion 112 and the strength member clamp portion 114.

Figure 19:
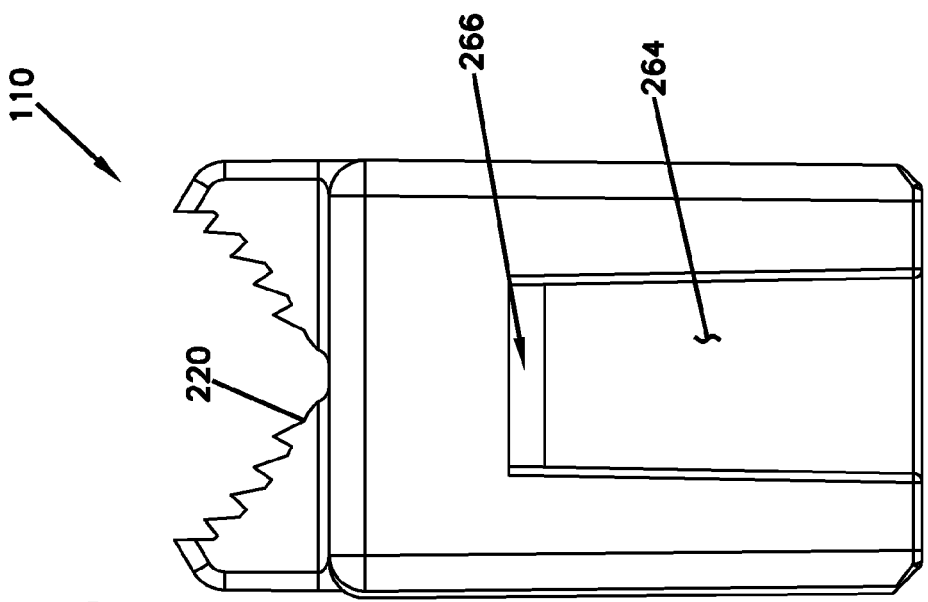
FIG. 19 is a rear view of the body of the cable termination unit of FIG. 16.
Figure 18:
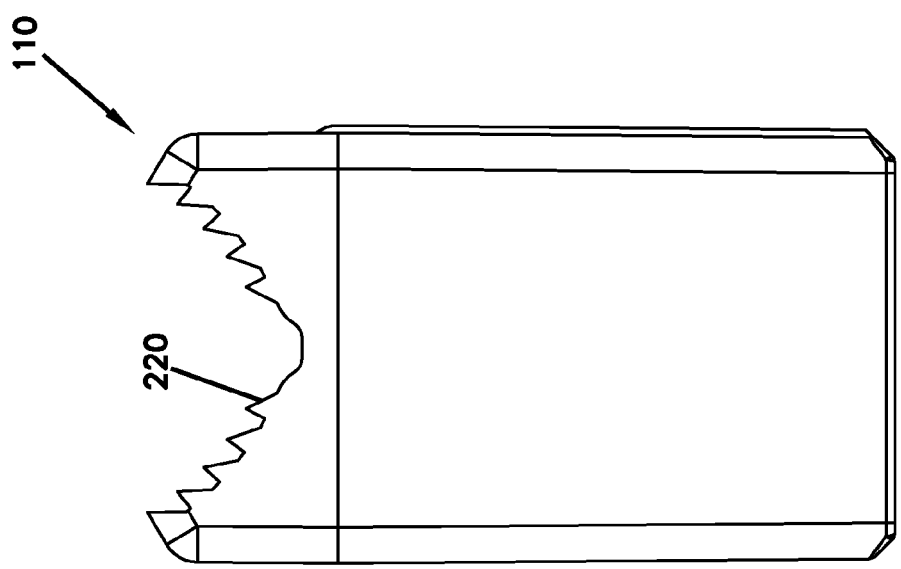
FIG. 18 is a front view of the body of the cable termination unit of FIG. 16.
Figure 20:
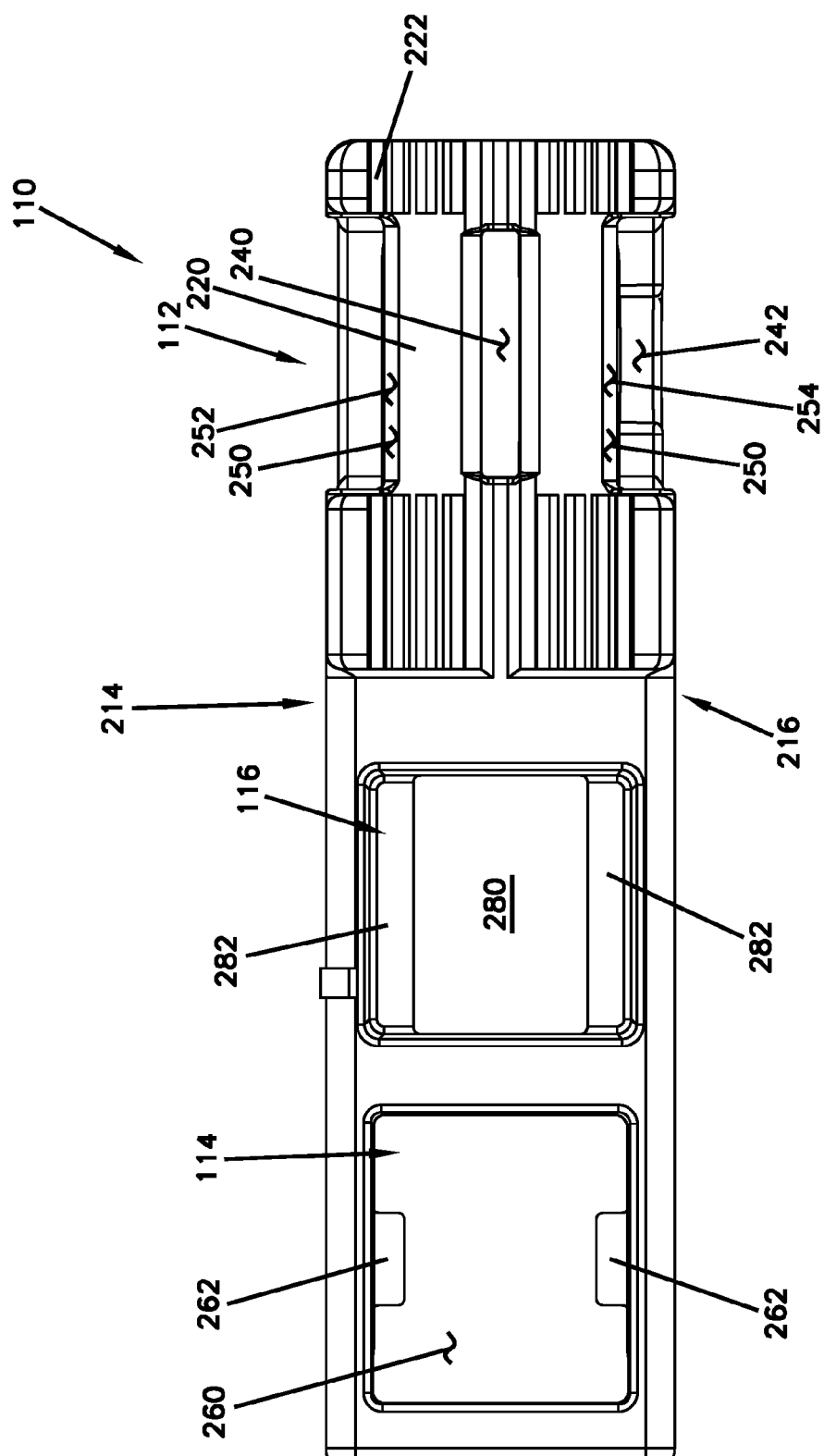
FIG. 20 is a top view of the body of the cable termination unit of FIG. 16.

The jacket clamp portion 112 includes a jacket seat portion 220 on which the cable jacket 34 is seated. From the front or rear view, as illustrated in FIGS. 19 and 20, the jacket seat portion 220 is generally configured as a V-shape or U-shape to complementarily accommodate the shape of the cable jacket 34. In some examples, the jacket seat portion 220 includes one or more grooved surfaces 222 to provide friction between the cable jacket 34 and the jacket seat portion 220 and thus improve fixation of the cable jacket 34 on the jacket seat portion 220.

The jacket clamp portion 112 is configured to cooperate with different types of jacket mount devices to clamp the cable jacket 34 to the cable termination unit 100. Examples of the jacket mount devices include the first jacket mount device 300 (FIGS. 13-15 and 28-30) and the second jacket mount device 400 (FIGS. 31-33).

Figure 21:
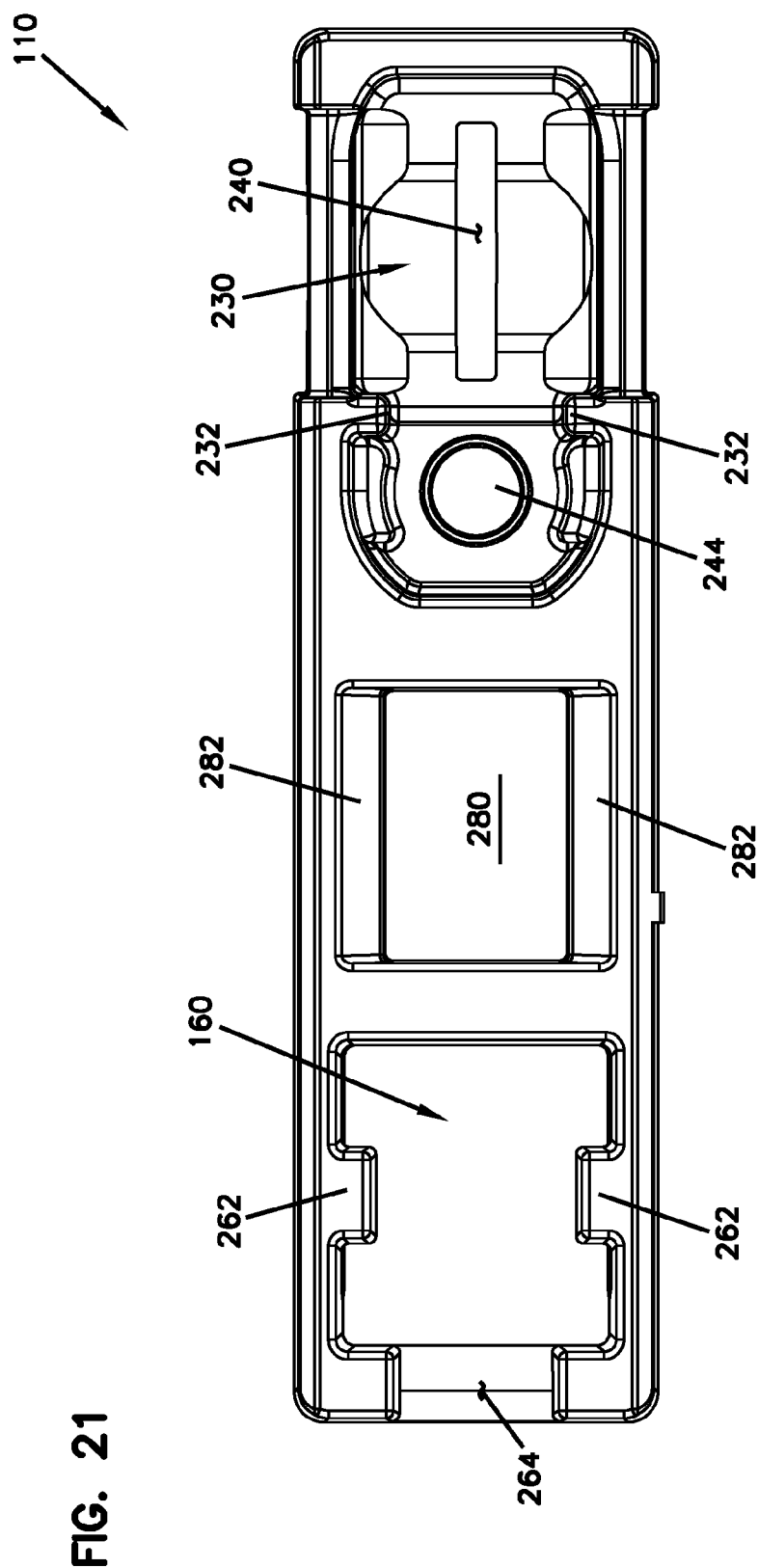
FIG. 21 is a bottom view of the body of the cable termination unit of FIG. 16.

As better shown in FIG. 21, the jacket clamp portion 112 includes a first cavity 230 configured to at least partially receive the first jacket mount device 300 in a second direction D2. The second direction D2 is perpendicular to the first direction D1 and extends from the bottom portion 212 to the top portion 210 of the body 110 or vice versa.

Figure 22:
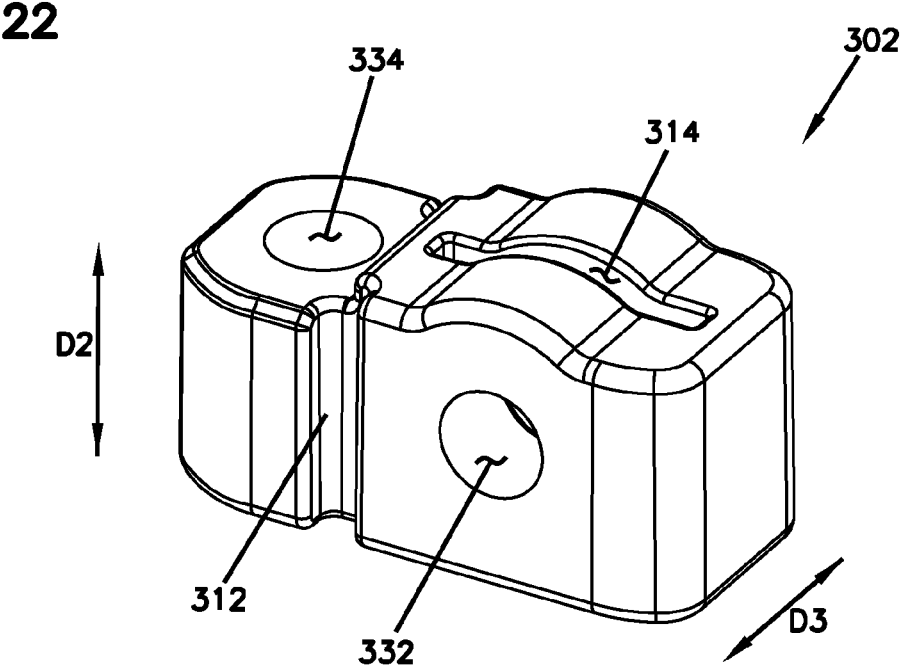
FIG. 22 is a perspective view of an example embodiment of a first body of a first jacket mount device.
Figure 23:
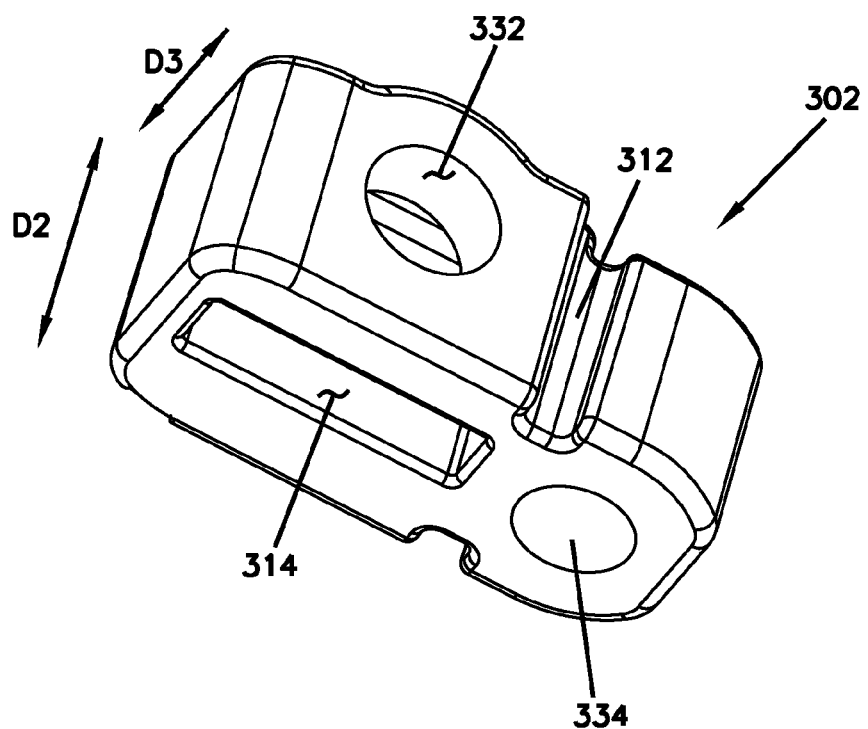
FIG. 23 is another perspective view of the first body of FIG. 22.
Figure 26:
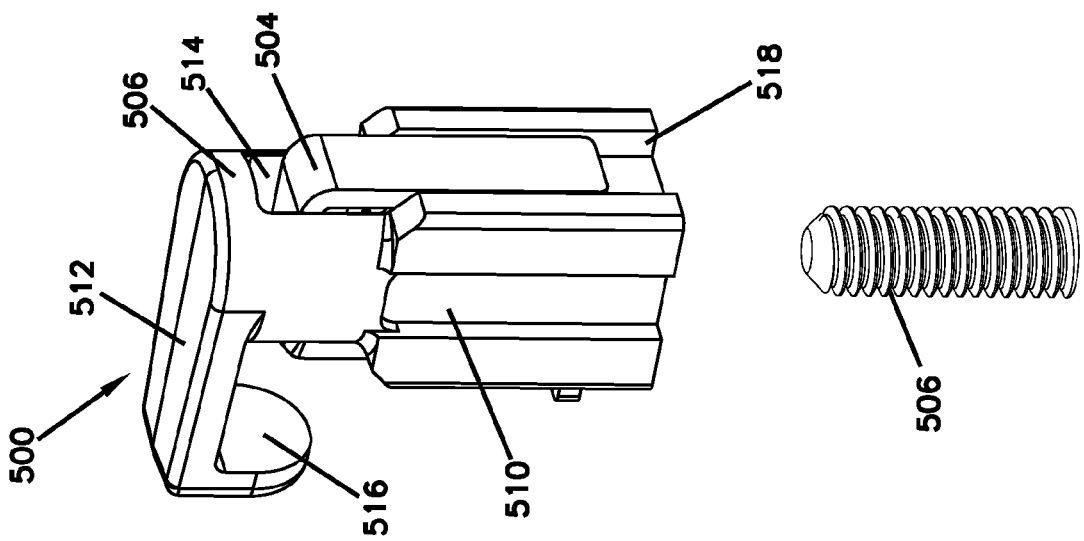
FIG. 26 is another partial exploded view of the strength member mount device of FIG. 25.
Figure 25:
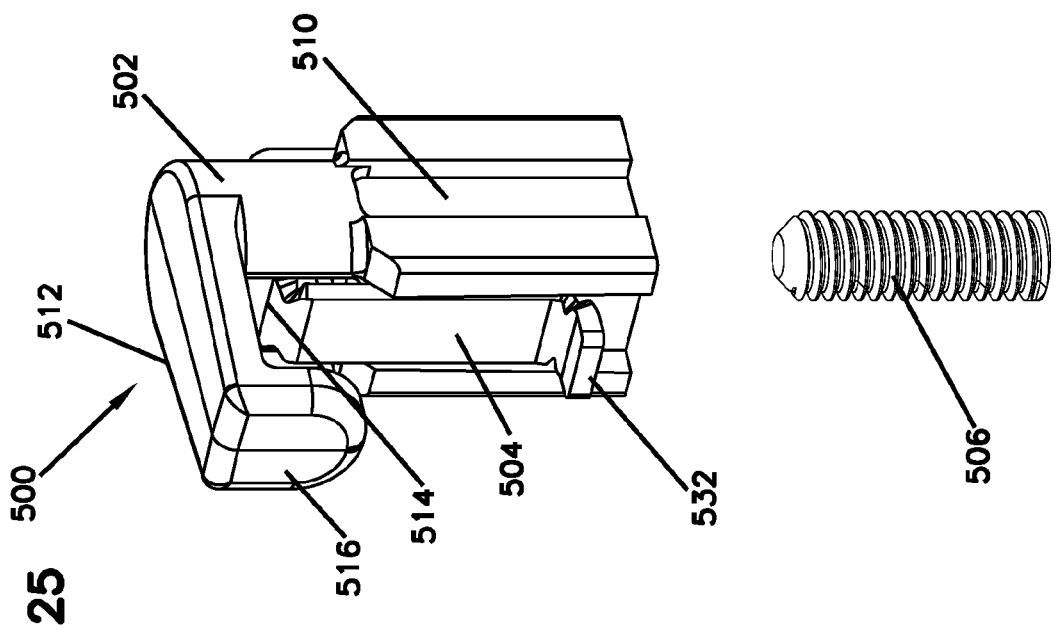
FIG. 25 is a partial exploded view of an example embodiment of a strength member mount device.
Figure 27:
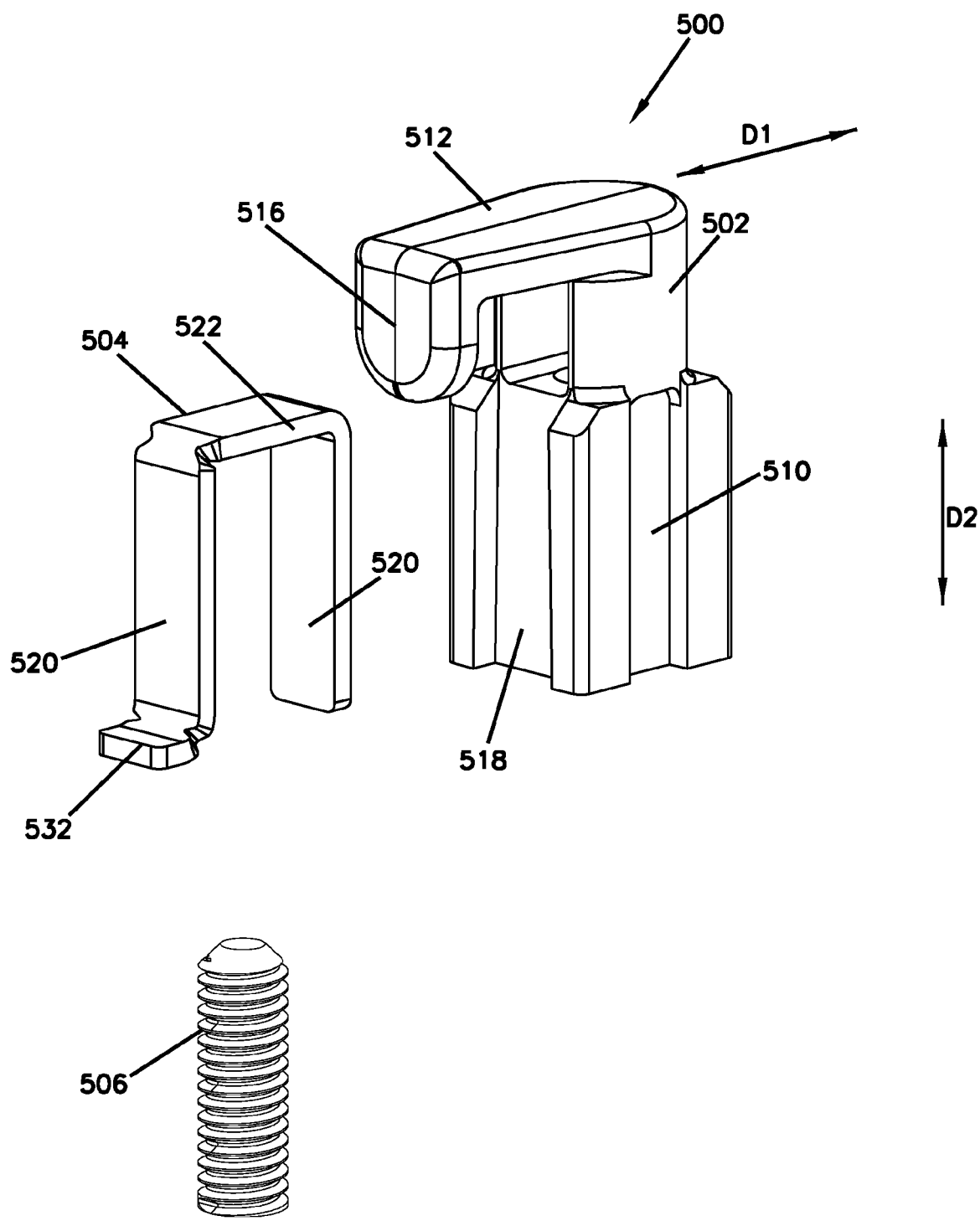
FIG. 27 is an exploded view of the strength member mount device of FIG. 25.

In some examples, the first body 302 of the first jacket mount device 300 is inserted into the first cavity 230 from the bottom portion 212 of the body 110. The first cavity 230 can be configured to complementarily receive the first body 302 therein along the second direction D2. For example, the first cavity 230 have a cross-sectional inner contour (taken across the second direction D2) corresponding to a cross-sectional outline (taken across the second direction D2) of the first body 302. As shown in FIGS. 22 and 23, the first body 302 can have one or more grooves 312 extending along the second direction D2. When the first body 302 is inserted into the first cavity 230, the grooves 312 engage ridges 232 formed at the inner surface of the first cavity 230 such that the first body 302 is guided along the second direction D2 within the first cavity 230.

The jacket clamp portion 112 further includes a first strap slot 240 which is in communication with the first cavity 230 in the second direction D2. The first strap slot 240 is formed to open at the exterior surface of the jacket seat portion 220 and extends to the first cavity 230 along the second direction D2. In some examples, the first strap slot 240 can be a narrow slit extending along the first direction D1 and configured to receive a portion of the first jacket strap 304 therethrough. As described herein, the first jacket strap 304 is used to wrap and arrange the cable jacket 34 on the jacket seat portion 220 and a portion of the first jacket strap 304 extends into the first cavity 230 through the first strap slot 240. The first strap slot 240 is shaped to enable at least a portion of the first jacket strap 304 to pass therethrough.

As shown in FIGS. 22 and 23, the first body 302 has a jacket strap hole 314 extending through the first body 302 in the second direction D2. The jacket strap hole 314 is arranged such that, when the first body 302 is inserted into the first cavity 230 of the body 110, the jacket strap hole 314 is aligned with the first strap slot 240. As described herein, a portion of the first jacket strap 304 can pass through the first strap slot 240 of the body 110 and the jacket strap hole 314 of the first body 302.

As illustrated in FIG. 24, in some examples, the first jacket strap 304 is configured to be flexible and provided as a flat strap 320. The first jacket strap 304 can be made of metal or plastic. The flat strap 320 is extendable around the cable jacket 34. For example, the flat strap 320 is deformed to wrap the cable jacket 34. When the first jacket strap 304 is deformed from the flat strap 320, the first jacket strap 304 can form a loop portion 322 and a coextensive portion 324. The loop portion 322 surrounds the cable jacket 34. The coextensive portion 324 is formed by a first non-loop portion 326 and a second non-loop portion 328 which do not surround the cable jacket 34. The first non-loop portion 326 and the second non-loop portion 328 cooperatively define the coextensive portion 324 by being aligned in parallel and coming into contact with each other. The first jacket strap 304 has a length sufficient to wrap different diameters of cable jackets. When a cable jacket of a larger diameter is wrapped by the first jacket strap 304, the loop portion 322 becomes correspondingly larger and the coextensive portion 324 becomes shorter.

When the first jacket strap 304 wraps the cable jacket 34, the coextensive portion 324 of the first jacket strap 304 is inserted to the first strap slot 240 of the body 110 and then the jacket strap hole 314 of the first body 302, while the first body 302 is engaged within the first cavity 230 of the body 110.

Figure 29:
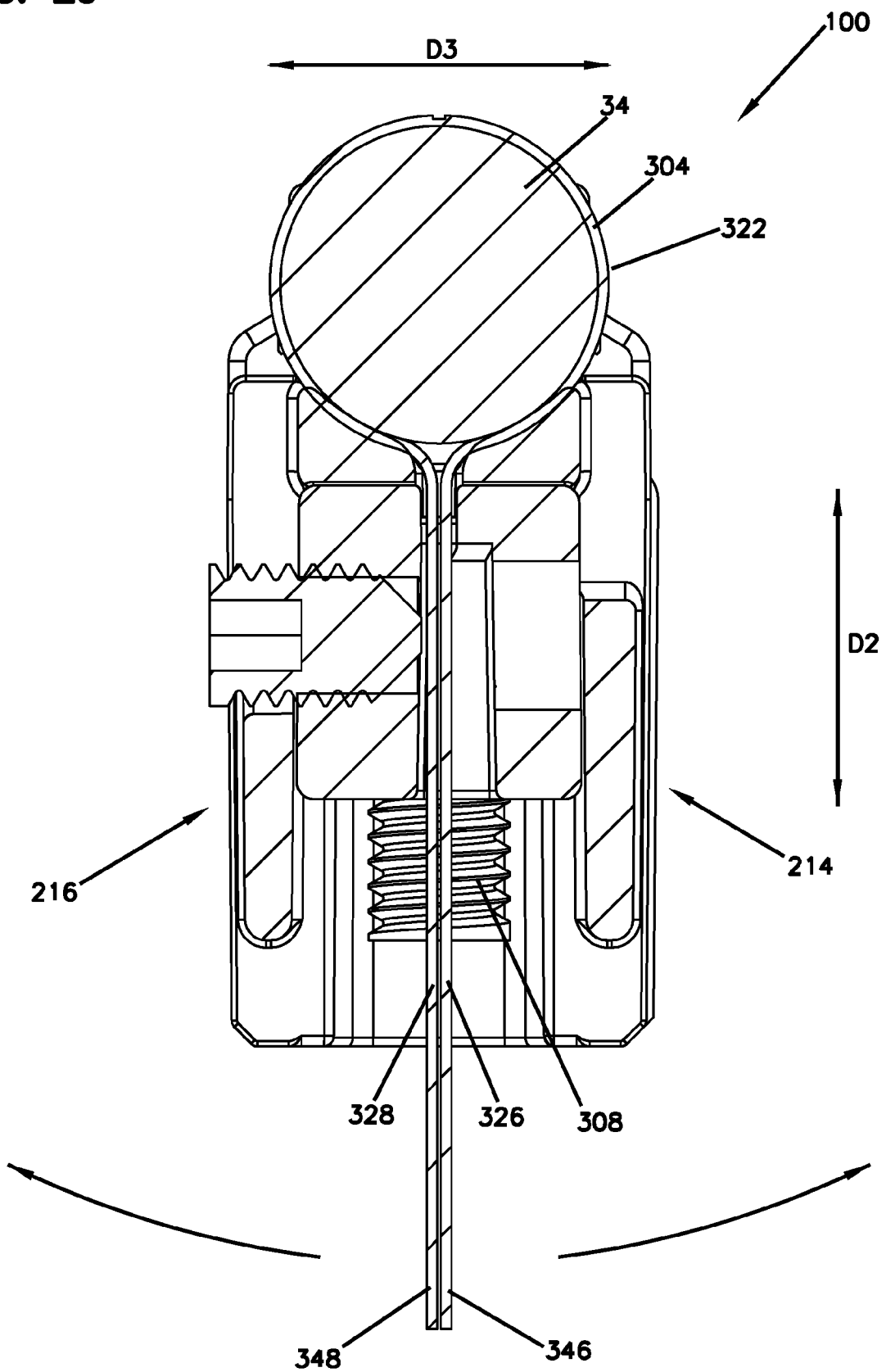
FIG. 29 is a front cross sectional view of the cable termination unit with the first jacket mount device, as illustrated in FIG. 13.
Figure 30A:
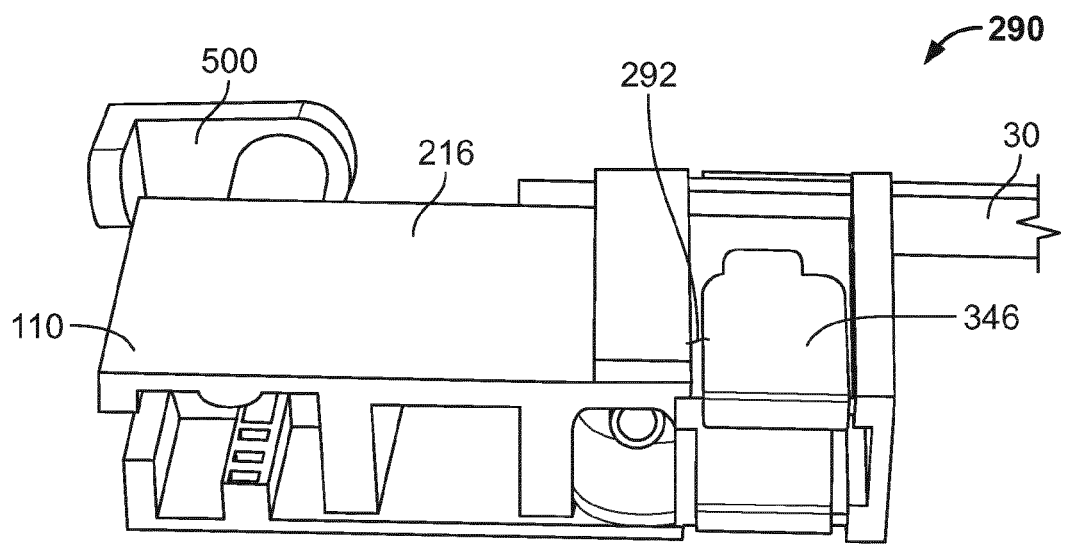
FIG. 30A is a side view of the cable termination unit of FIG. 13 with an coextensive portion stored in the cable termination unit.
Figure 30B:
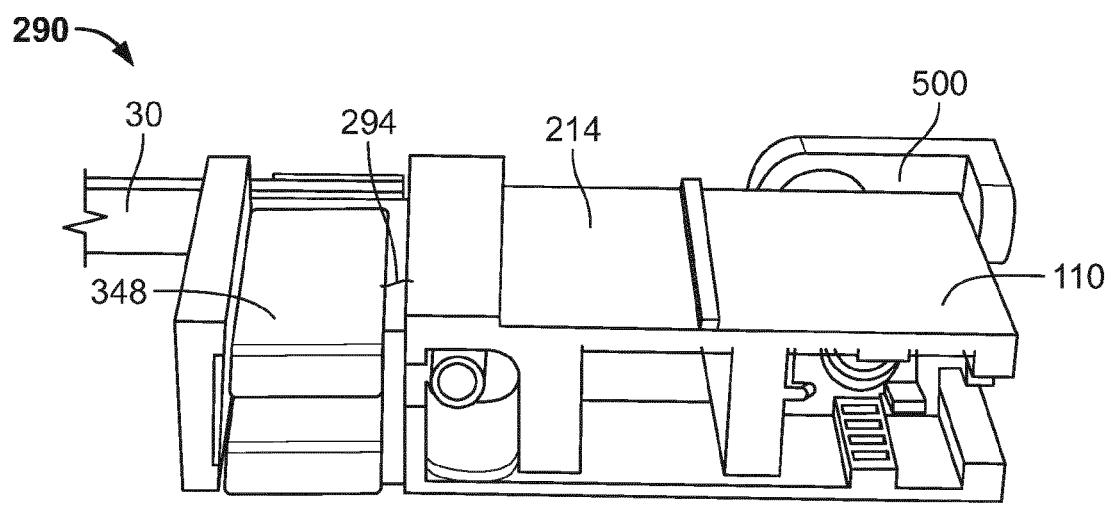
FIG. 30B is an opposite side view of the cable termination unit of FIG. 30A.

The first fastener 306 can be used to fix the first jacket strap 304 to the first body 302. In the illustrated example, the jacket clamp portion 112 of the body 110 includes a first fastener aperture (also referred to herein as a third opening) 242 extending in a third direction D3, and the first body 302 has a first fastener hole 332 extending in the third direction D3. The third direction D3 can be perpendicular to the first direction D1 and the second direction D2. In some examples, the first fastener 306 includes a screw, and the first fastener hole 332 has a threaded inner surface for engaging the first fastener 306. When the coextensive portion 324 of the first jacket strap 304 is inserted into the first body 302 through the first strap slot 240 of the body 110 (in the second direction D2), the first fastener 306 is inserted through the first fastener aperture 242 of the body 110 and screwed into the first fastener hole 332 of the first body 302 (in the third direction D3), thereby holding the coextensive portion 324 in position relative to the first body 302, as illustrated in FIG. 29.

In the illustrated example, the first fastener aperture 242 is formed in the first side portion 214 of the body 110 and configured to engage the first fastener 306 through the first side portion 214 in the third direction D3. As described herein, the first fastener aperture 242 can be connected to a second strap slot 250 (e.g., a second opening 254 thereof), as illustrated in FIGS. 13-15 and 17. In other examples, the first fastener aperture 242 is arranged separately from the second strap slot 250 so as not to be connected to the second strap slot 250.

Figure 28:
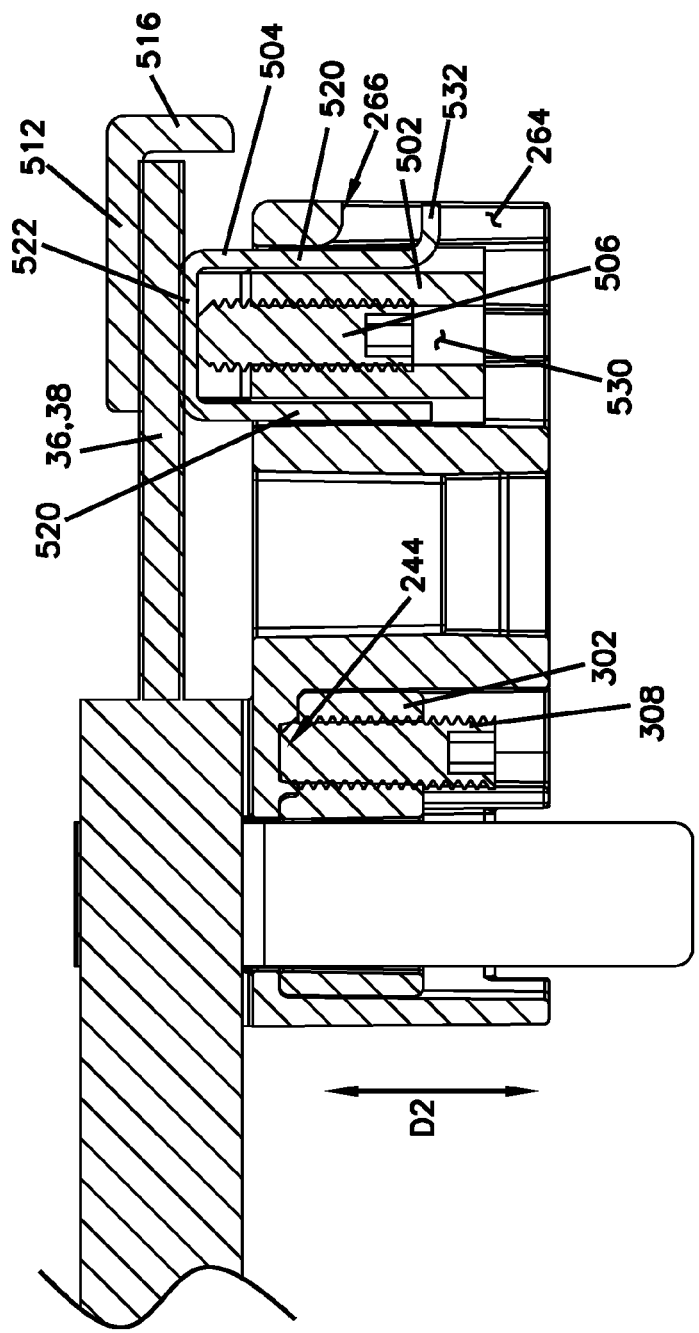
FIG. 28 is a side cross sectional view of the cable termination unit with the first jacket mount device, as illustrated in FIG. 13.

The second fastener 308 is used to arrange the first body 302 in place relative to the body 110 and tighten the first jacket strap 304 around the cable jacket 34. In the illustrated example, the first body 302 has a second fastener hole 334 extending in the second direction D2. In some example, the second fastener 308 includes a screw, and the second fastener hole 334 has a threaded inner surface for engaging the second fastener 308. When screwed in the second fastener hole 334, the second fastener 308 moves the first body 302 upwards (in the second direction D2) to cause tightening of the first jacket strap 304 (in the form of wrap) around the cable jacket 34 on the jacket seat portion 220 of the body 110, as illustrated in FIGS. 28 and 29. In some example, as illustrated in FIGS. 21 and 28, the first body 302 has a second fastener stop recess 244 on the inner surface of the first cavity 230, which corresponds with the second fastener hole 334 of the first body 302 when the first body 302 is inserted into the first cavity 230.

As such, the first fastener 306 can be inserted into the body 110 and at least partially reside in the first body 302 to lock the first jacket strap 304, which wraps the cable jacket 34, and allow for tightening of the first jacket strap 304 using the second fastener 308.

As illustrated in FIGS. 13, 14, 28 and 29, when the coextensive portion 324 of the first jacket strap 304 is inserted to the first strap slot 240 of the body 110 and then the jacket strap hole 314 of the first body 302 engaged with the first cavity 230 of the body 110, a portion of the coextensive portion 324 can extend out from the jacket strap hole 314 of the first body 302, depending on the length of the first jacket strap 304. If the first jacket strap 304 is longer, a portion of the coextensive portion 324 can extend out even from the first cavity 230 of the body 110, as shown in FIGS. 13, 14, 28 and 29. In some examples, the jacket clamp portion 112 of the body 110 includes a strap storage area 290 for storing the part of the coextensive portion 324 extending out from the body 110. The strap storage area 290 includes a first strap receiving area 292 for a portion (e.g., a first extended part 346) of the first non-loop portion 326 which extends from the bottom of the body 110, and a second strap receiving area 294 for a portion (e.g., a second extended part 348) of the second non-loop portion 328 which extends from the bottom of the body 110. In some examples, the first strap receiving area 292 can be formed as a recess or slot on the first side portion 214 of the body 110 and the second strap receiving area 294 can be formed as a recess or slot on the second side portion 216 of the body 110. As illustrated in FIG. 29, when the coextensive portion 324 (including the first non-loop portion 326 and the second non-loop portion 328) extends from the bottom portion 212 of the body 110, the first extended part 346 of the first non-loop portion 326 and the second extended part 348 of the second non-loop portion 328 are bent upwards (in a direction from the bottom portion 212 to the top portion 210 of the body 110) and towards the first side portion 214 and the second side portion 216, respectively, so as to be received in the first strap receiving area 292 and the second strap receiving area 294, respectively.

In some examples, the first strap receiving area 292 and the second strap receiving area 294 are recessed from the surface levels of the first side portion 214 and the second side portion 216, respectively. The bent portions of the first non-loop portion 326 and the second non-loop portion 328 are received in the first strap receiving area 292 and the second strap receiving area 294 below the surface levels of the first side portion 214 and the second side portion 216, thereby maintaining the profiles of the first side portion 214 and the second side portion 216 of the body 110. Such recessed configurations of the first and second strap receiving areas allow the cable termination unit 100 to maintain its form factor so that the extend parts of the strap do not interfere with insertion of the cable termination unit 100 to the closure 10, such as the cable termination unit holder 40, 90 of the closure 10.

Referring still to FIGS. 16-21, the jacket clamp portion 112 further includes a second strap slot 250 configured to receive the second jacket mount device 400 to fasten the cable jacket 34 on the jacket seat portion 220. The second strap slot 250 extends across the body 110 in the third direction D3. In some examples, the second strap slot 250 is in communication with the first cavity 230 of the body 110.

As illustrated, the second strap slot 250 can include a first opening 252 defined in the first side portion 214 and a second opening 254 defined in the second side portion 216. The first opening 252 and the second opening 254 are aligned to correspond with each other in the third direction D3. In some examples, the first opening 252 and the second opening 254 are in communication with the first cavity 230 of the body 110.

As described herein, the second jacket mount device 400 can include a hose clamp 410 (FIGS. 31 and 32) or a cable strap or tie (e.g., zip tie) 420 (FIG. 33). The second jacket mount device 400 can pass through the second strap slot 250 (e.g., the first opening 252 and the second opening 254) across the body 110 in the third direction D3 and wrap and arrange the cable jacket 34 on the jacket seat portion 220, as illustrated in FIGS. 31-33.

Referring still to FIGS. 15-21, the body 110 includes the strength member clamp portion 114. The strength member clamp portion 114 is configured to cooperate with the strength member mount device 500 to clamp the strength member 36 (such as the central strength member 38) to the cable termination unit 100.

In the illustrated example, the strength member clamp portion 114 includes a second cavity 260 configured to at least partially receive the strength member mount device 500. The strength member mount device 500 is movable in the second direction D2 while being received within the second cavity 260. In some examples, the strength member clamp portion 114 includes one or more guide projections 262, a pressing element guide opening 264, and a movement limiter 266.

As illustrated in FIGS. 15 and 25-27, the strength member mount device 500 includes the second body 502, the pressing element 504, and the third fastener 506. The second body 502 is configured to be inserted into the second cavity 260 and movable along the second direction D2 relative to the body 110. In some examples, the second body 502 includes one or more grooves 510 which extend along the third direction D3 and correspond with the guide projections 262 of the strength member clamp portion 114. The grooves 510 of the second body 502 engage with the guide projections 262 when the second body 502 is received within the second cavity 260, and thereby the second body 502 can move along the guide projections 262.

The second body 502 includes a cover portion 512 and defines a channel 514 through which the strength member 36 of the cable 30 passes under the cover portion 512. The cover portion 512 is generally L-shaped and includes a stopper 516 arranged apart from the channel 514 along the direction (i.e., the first direction D1) in which the strength member 36 extends through the channel 514. The stopper 516 is arranged ahead of the channel 514 and configured to contact with a trimmed end of the strength member 36 and restrain movement of the strength member 36 in the first direction D1 during installation or maintenance.

The pressing member 504 is movably mounted to the second body 502 and configured to press the strength member 36 against the cover portion 512. In the illustrated example, the second body 502 includes two guide slots 518 extending in the second direction D2 and configured to receive vertical legs 520 of the pressing member 504. The pressing member 504 can move relative to the second body 502 along the second direction D2 while the vertical legs 520 of the pressing member 504 are guided by the guide slots 518 in the second direction D2. When the pressing member 504 is mounted to the second body 502, a horizontal portion 522 of the pressing member 504 is arranged at the channel 514 of the second body 502, and the strength member 36 can be disposed between the horizontal portion 522 of the pressing member 504 and the cover portion 512 of the second body 502. As the pressing member 504 moves toward the cover portion 512 in the second direction D2, the horizontal portion 522 can press the strength member 36 against the cover portion 512.

The third fastener 506 is used to press the pressing member 504 against the cover portion 512 of the second body 502. The second body 502 has a fastener hole 530 extending along the second direction D2. The fastener hole 530 has a threaded inner surface, through which the third fastener 506 can be screwed. As illustrated in FIG. 28, as the third fastener 506 is screwed upwards, the head of the third fastener 506 abuts the horizontal portion 522 of the pressing member 504 and pushes the pressing member 504 toward the cover portion 512 of the second body 502.

The pressing member 504 can further include a movement limit projection 532 which is guided by the pressing element guide opening 264 of the body 110. The movement limit projection 532 contacts the movement limiter 266 of the body 110 when the pressing member 504 (and thus the second body 502) moves upwards (in the second direction D2) to a predetermined height. The movement limit projection 532 and the movement limiter 266 can be used to prevent the assembly of the second body 502 and the pressing member 504 from being removed from the body 110.

Referring still to FIGS. 15-21, the body 110 includes the closure mount portion 116. The closure mount portion 116 is configured to mount the body 110 to the closure 10. In some embodiments, the closure mount portion 116 is configured to engage the cable termination unit holder 40, 90, as described with reference to FIGS. 4-5 and 9-11.

In the illustrated example, the closure mount portion 116 includes a third cavity 280 and one or more flanges 282. For example, the fasteners of the cable termination unit holder 40, 90, such as the clip arms 98 (FIG. 11), are inserted into the third cavity 280 and engage with the flanges 282 to mount the body 110 to the cable termination unit holder 40, 90. Other configurations are also possible to mount the body 110 to the cable termination unit holder 40, 90 or to another portion of the closure 10.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. An apparatus for clamping a cable separately from a telecommunications closure, the apparatus configured to be mounted to the telecommunications closure, the apparatus comprising:
  a body extending in a first direction and configured to support a cable extending in the first direction, the body including:
    a closure mount portion configured to mount the body to a telecommunications closure;
    a strength member clamp portion configured to fasten a strength member of the cable; and
    a jacket clamp portion spaced apart from the strength member clamp portion in the first direction, the jacket clamp portion including:
      a jacket seat portion on which a jacket of the cable is seated;
      a first cavity configured to at least partially receive a first jacket mount device in a second direction perpendicular to the first direction, the first jacket mount device including a first jacket strap configured to fasten the jacket on the jacket seat portion;

a first strap slot being in communication with the first cavity, the first strap slot allowing the first jacket strap to pass therethrough and partially extend above the jacket seat portion; and a second strap slot extending in a third direction perpendicular to the first direction and the second direction and configured to receive a second jacket mount device configured to fasten the jacket on the jacket seat portion, wherein the body has a forward end and a rearward end in the first direction, the body having a top portion, a bottom portion, a first side portion, and an opposite second side portion, the top, bottom, first side, and second side portions extending between the forward end and the rearward end, and wherein the second strap slot includes a first opening defined in the first side portion and a second opening defined in the second side portion and corresponding to the first opening such that a second jacket strap of the second jacket mount device passes through the first opening and the second opening to wrap and support the jacket on the jacket seat portion.

2. The apparatus according to claim 1, further comprising the first jacket mount device including the first jacket strap.

3. The apparatus according to claim 1, wherein the first jacket strap is extendable around the jacket and configured to form a loop portion, a first non-loop portion, and a second non-loop portion, the loop portion surrounding the jacket, and the first non-loop portion and the second non-loop portion cooperatively defining a coextensive portion extending from the loop portion, and wherein the first jacket mount device further includes:
a first block received in the first cavity and configured to receive the coextensive portion of the first jacket strap through the first strap slot; and
a first fastener configured to fix the first jacket strap to the first block.

4. The apparatus according to claim 1, wherein the first opening and the second opening are in communication with the first cavity.

5. The apparatus according to claim 1, wherein the body further includes a third opening for engaging a first fastener through the body.

6. The apparatus according to claim 1, wherein the body further includes a third opening formed in the first side portion of the body, the third opening configured to engage a first fastener through the first side portion of the body in the third direction.

7. The apparatus according to claim 1, wherein the first jacket mount device further includes a fastener configured to tighten the first jacket strap around the jacket.

8. The apparatus according to claim 7, wherein the fastener is engaged in the second direction.

9. The apparatus according to claim 3, wherein the loop portion is adjustable to accommodate different diameters for the jacket.

10. The apparatus according to claim 1, wherein the jacket seat portion is configured as a V-shape for generally complementing a shape of the jacket of the cable.

11. The apparatus according to claim 1, wherein the jacket seat portion includes a grooved surface.

12. The apparatus according to claim 1, wherein the jacket clamp portion includes a strap storage area for storing a portion of the first jacket strap which extends from the body.

13. The apparatus according to claim 12, wherein the strap storage area includes a first strap receiving area formed on the first side portion of the body, the first strap receiving area being recessed from the first side portion of the body.

14. The apparatus according to claim 13, wherein the strap storage area includes a second strap receiving area formed on the second side portion of the body, the second strap receiving area being recessed from the second side portion of the body.

15. An apparatus for clamping a cable separately from a telecommunications closure, the apparatus configured to be mounted to the telecommunications closure, the apparatus comprising:

a body configured to support a cable, the body including:
a closure mount portion configured to mount the body to a telecommunications closure; and
a jacket clamp, including:
a jacket seat portion on which a jacket of the cable is seated;
a first strap slot being in communication with a first cavity, the first strap slot allowing a first jacket strap to pass therethrough and partially extend above the jacket seat portion; and
a strap storage area for storing a portion of the first jacket strap which extends from the body,
wherein the strap storage area includes a first strap receiving area formed on one side of the body, the first strap receiving area being recessed from the one side of the body.

16. The apparatus according to claim 15, further comprising the first jacket strap, the first jacket strap being adjustable for different jacket diameters.

17. The apparatus according to claim 15, further comprising:
a first jacket mount device including a first block,
wherein the body extends in a first direction in which the cable is arranged on the body;
wherein the jacket clamp portion includes a first cavity configured to at least partially receive the first jacket mount device in a second direction perpendicular to the first direction, and
wherein the first jacket strap mounts to the first block and is configured to fasten the jacket on the jacket seat portion.

18. The apparatus according to claim 15, wherein the strap storage area includes a second strap receiving area formed on the other side of the body, the second strap receiving area being recessed from the other side of the body.

19. The apparatus according to claim 17, wherein the jacket clamp portion includes a second strap slot extending in a third direction perpendicular to the first direction and the second direction and configured to receive a second jacket mount device configured to fasten the jacket on the jacket seat portion.

20. The apparatus according to claim 15, wherein the jacket clamp portion includes a strength member clamp portion configured to fasten a strength member of the cable.

* * * * *